(12) United States Patent
Valdez et al.

(10) Patent No.: US 12,455,090 B2
(45) Date of Patent: Oct. 28, 2025

(54) HVAC MANAGEMENT AND CONTROL SYSTEM

(71) Applicant: Nuve Controls LLC, Anaheim, CA (US)

(72) Inventors: Ismael Valdez, Orange, CA (US); Sergo Oganov, Yerevan (AM)

(73) Assignee: NUVE CONTROLS LLC, Anaheim, CA (US)

(*) Notice: Subject to any disclaimer, the term of this patent is extended or adjusted under 35 U.S.C. 154(b) by 0 days.

(21) Appl. No.: 18/499,140

(22) Filed: Oct. 31, 2023

(65) Prior Publication Data

US 2025/0137674 A1    May 1, 2025

(51) Int. Cl.
    *F24F 11/56*     (2018.01)
    *F24F 11/52*     (2018.01)

(52) U.S. Cl.
    CPC .............. *F24F 11/56* (2018.01); *F24F 11/52* (2018.01)

(58) Field of Classification Search
    USPC ....................................................... 700/276
    See application file for complete search history.

(56) References Cited

U.S. PATENT DOCUMENTS

| | | | | |
|---|---|---|---|---|
| 11,233,713 B2* | 1/2022 | Brinkman | .......... | G05B 23/0221 |
| 2001/0047286 A1* | 11/2001 | Walker | ................... | G16H 40/20 |
| | | | | 705/34 |
| 2002/0180590 A1* | 12/2002 | Abrams | .................... | G08B 1/08 |
| | | | | 340/286.06 |
| 2007/0043478 A1* | 2/2007 | Ehlers | ...................... | F24F 11/58 |
| | | | | 700/276 |
| 2009/0140056 A1* | 6/2009 | Leen | ...................... | G05B 15/02 |
| | | | | 236/49.3 |
| 2011/0219651 A1* | 9/2011 | Borreggine | ............... | G09F 9/33 |
| | | | | 296/180.1 |
| 2011/0282937 A1* | 11/2011 | Deshpande | ........... | G06F 9/5055 |
| | | | | 709/206 |
| 2015/0127167 A1* | 5/2015 | Quam | .................. | H04L 12/2825 |
| | | | | 700/275 |
| 2015/0127174 A1* | 5/2015 | Quam | ................ | G06Q 10/0639 |
| | | | | 700/275 |
| 2015/0163945 A1* | 6/2015 | Barton | ..................... | G08B 5/36 |
| | | | | 361/809 |
| 2015/0302414 A1* | 10/2015 | Cox | ....................... | G06Q 20/127 |
| | | | | 705/7.19 |
| 2017/0234566 A1* | 8/2017 | Gerszewski | .......... | H04W 12/06 |
| | | | | 700/276 |
| 2021/0071889 A1* | 3/2021 | Picardi | ...................... | F24F 11/49 |
| 2023/0036192 A1* | 2/2023 | Alakoye | .................. | G10L 15/26 |

* cited by examiner

*Primary Examiner* — Emilio J Saavedra
(74) *Attorney, Agent, or Firm* — Venable LLP; Ryan T. Ward

(57) ABSTRACT

A device may grant a computing device associated with a contractor account messaging access to a heating, ventilation, and air conditioning ("HVAC") control unit. A device may receive, message data from the computing device associated with the contractor account. A device may automatically cause the message data to be displayed on a user interface of the HVAC control unit.

14 Claims, 20 Drawing Sheets

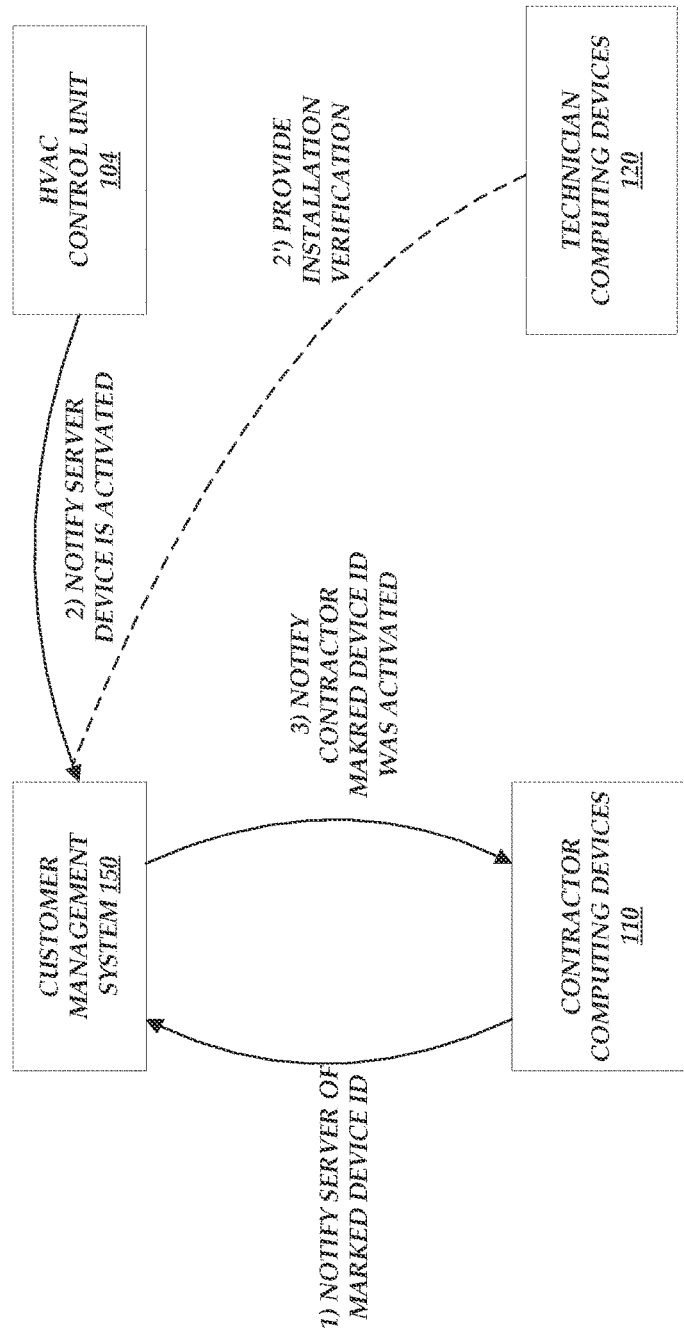

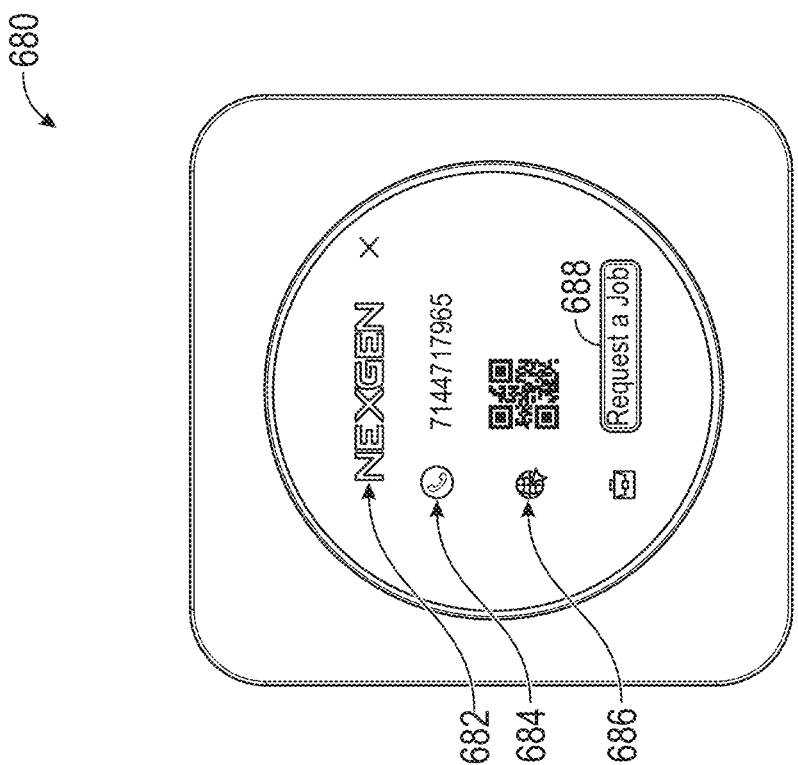
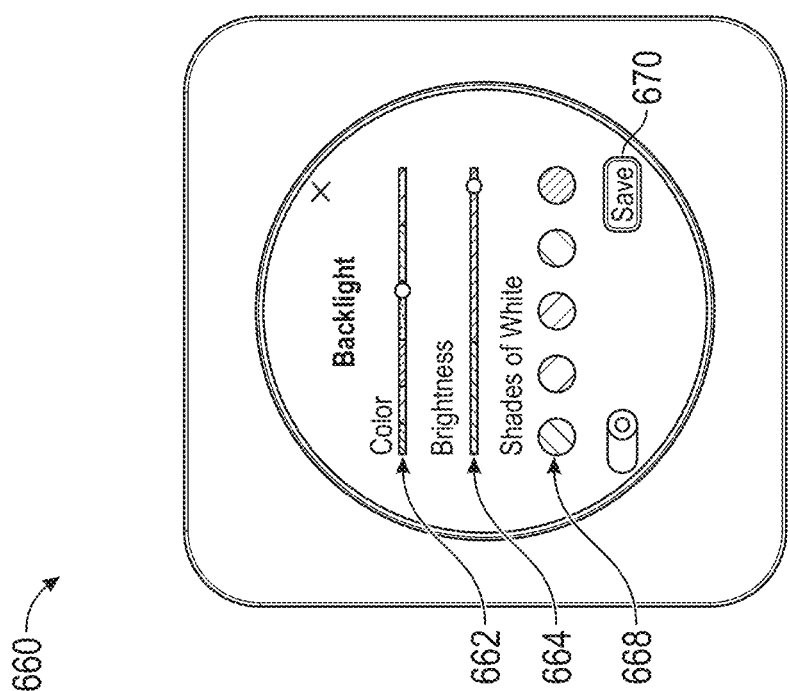

Add contractor

ID: [Input text]
Company name*: [Input text]
Brand name*: [Input text]
EIN/SSN*: [Input text]
Address 1*: [Input text]
Address 2: [Input text]
Zip code*: [Input text]
City*: [Input text]
State*: [Input text]

URL*: [Input text]
Web scheduler page*: [Input text]
First name*: [Input text]
Last name*: [Input text]
Tel. number 1*: [Input text]
Tel. number 2: [Input text]
Email*: [Input text]
Upload your logo*: Chose file Enable — 752
Client ID: [Input text]
Client Secret: [Input text]
Grant type: [Input text]
⊙ Check
Account status*: [Input text]
Comment*: Add contractor Save  Cancel

HVAC MANAGEMENT AND CONTROL SYSTEM

BACKGROUND

Technical Field

This patent specification relates to systems, methods, and related computer program products for the monitoring and control of energy-consuming systems or other resource-consuming systems. More particularly, this patent specification relates to user interfaces for control units that govern the operation of control devices, including user interfaces for thermostats that govern the operation of heating, ventilation, and air conditioning (HVAC) systems.

Background

Thermostats have been used to control heating and cooling systems. Older generation thermostats were mechanical devices. The mechanical thermostats required neither electronics nor power to operate. Electronic thermostats, though requiring a power source in order to operate, offered more advanced HVAC control as compared to their mechanical counterparts. Increases in functionality for electronic thermostats are often accompanied by increased complications and a need for more reliable monitoring of the HVAC system in order to keep it running efficiently.

SUMMARY

The systems, methods, and devices of this disclosure each have several innovative aspects, no single one of which is solely responsible for all of the desirable attributes disclosed herein.

In some aspects, the techniques described herein relate to a heating, ventilation, and air conditioning ("HVAC") control unit including: at least one processor; and non-transitory computer-readable instructions which, when executed by the at least one processor, configure the control unit to: control operation of an HVAC system within a building unit; generate a graphical user interface, the graphical user interface including at least a first user interface screen configured to receive user input to control operation of the HVAC system, and a second user interface screen configured to display messaging data; establish communication with a remote server computing system; receive, from the remote server computing system, communication data associated with a third party account, wherein the third party account is configured to have messaging access to the HVAC control unit; generate message data based at least in part on the communication data associated with the third party account; and automatically cause the message data to be displayed on at least the second user interface screen of the HVAC control unit.

In some aspects, the techniques described herein relate to a HVAC control unit, wherein the message data includes a customized message based at least in part on a location of the building unit or weather information associated with the location of the building unit.

In some aspects, the techniques described herein relate to a HVAC control unit, wherein the message data includes timing information; and wherein the instructions, when executed by the at least one processor, further cause, based on the timing information, display of the message data on the second user interface screen within a specified timeframe, and remove the message data from the second user interface screen of the HVAC control unit.

In some aspects, the techniques described herein relate to a HVAC control unit, wherein the third party account is configured to have remote testing access to the HVAC control unit, wherein the non-transitory computer-readable instructions further configure the at least one processor to: receive, from the remote server computing system and associated with the third party account, control instructions, wherein the control instruction are configured to cause the HVAC control unit to operate the HVAC system; and send, to the remote server computing system, operational data associated with the operation of the HVAC system.

In some aspects, the techniques described herein relate to a HVAC control unit, wherein the non-transitory computer-readable instructions further configure the at least one processor to: transmit a maintenance request from the HVAC control unit, wherein the remote server computing system is configured to create a maintenance job from the maintenance request, grant, the third party account access to the maintenance job; receive information associated with the maintenance job from the third party account; and receive information associated with the maintenance job to be displayed on the user interface of the HVAC control unit.

In some aspects, the techniques described herein relate to a HVAC control unit, the non-transitory computer-readable instructions further configure the at least one processor to: transmit operational data associated with operation of the HVAC system; receive alert data from the server computing system, wherein the alert data is generated based on the operational data; and automatically cause the alert data to be displayed on a graphical user interface screen.

In some aspects, the techniques described herein relate to a computer-implemented method including: establishing communication with heating, ventilation, and air conditioning ("HVAC") control unit, wherein the HVAC control unit is configured to: control operation of an HVAC system within a building unit, and generate a graphical user interface, the user interface including at least a first user interface screen configured to receive user input to control operation of the HVAC system, and a second user interface screen configured to display messaging data; and transmitting, to the HVAC control unit, communication data associated with a third party account control unit, wherein the third party account is configured to have messaging access to the HVAC control unit; wherein the communication data is configured to cause the HVAC control unit to: generate message data based at least in part on the communication data associated with the third party account; and automatically cause display of the message data to be displayed on at least the second user interface screen of the HVAC control unit.

In some aspects, the techniques described herein relate to a computer-implemented method, wherein the message data includes a customized message based at least in part on a location of the building unit or weather information associated with the location of the building unit.

In some aspects, the techniques described herein relate to a computer-implemented method, wherein the message data includes timing information; and wherein the communication data is configured to further cause the HVAC control unit to, based on the timing information, display the message data on the second user interface screen within a specified timeframe, and remove the message data from the second user interface screen of the HVAC control unit.

In some aspects, the techniques described herein relate to a computer-implemented method, wherein the third party account is configured to have remote testing access to the HVAC control unit, and wherein the computer-implemented method further includes: transmitting, to the HVAC control unit, control instructions associated with the third party account, wherein the control instruction are configured to cause the HVAC control unit to operate the HVAC system; and receiving, from the HVAC control unit, operational data associated with the operation of the HVAC system.

In some aspects, the techniques described herein relate to a computer-implemented method, further including: receiving a maintenance request from the HVAC control unit; generating a maintenance job from the maintenance request; granting the third party account access to the maintenance job; receiving information associated with the maintenance job from the third party account; and causing the information associated with the maintenance job to be displayed on the user interface of the HVAC control unit.

In some aspects, the techniques described herein relate to a computer-implemented method, further including: receiving, from the HVAC control unit, operational data associated with operation of the HVAC system; generating alert data based on the operational data; and automatically causing the alert data to be displayed on a graphical user interface screen.

In some aspects, the techniques described herein relate to non-transitory computer storage media storing instructions that when executed by a system of at least one processor, cause the at least one processor to perform operations including: controlling operation of a heating, ventilation, and air conditioning ("HVAC") system within a building unit; generating a graphical user interface, the user interface including at least a first user interface screen configured to receive user input to control operation of the HVAC system, and a second user interface screen configured to display messaging data; establishing communication with a remote server computing system; receiving, from the remote server computing system, communication data associated with a third party account, wherein the third party account is configured to have messaging access to an HVAC control unit; generating message data based at least in part on the communication data associated with the third party account; and automatically causing display of the message data to be displayed on at least the second user interface screen of the HVAC control unit.

In some aspects, the techniques described herein relate to a non-transitory computer storage media, wherein the message data includes a customized message based at least in part on a location of the building unit or weather information associated with the location of the building unit.

In some aspects, the techniques described herein relate to a non-transitory computer storage media, wherein the message data includes timing information; and wherein the instructions are further configured to cause, based on the timing information, the at least one processor to perform operations including: displaying the message data on the second user interface screen within a specified timeframe, and removing the message data from the second user interface screen of the HVAC control unit.

In some aspects, the techniques described herein relate to a non-transitory computer storage media, wherein the third party account is configured to have remote testing access to the HVAC control unit, and wherein the instructions are further configured to cause the at least one processor to perform operations including: receiving, from the remote server computing system and associated with the third party account, control instructions, wherein the control instruction are configured to cause the HVAC control unit to operate the HVAC system; and sending, to the remote server computing system, operational data associated with the operation of the HVAC system.

In some aspects, the techniques described herein relate to a non-transitory computer storage media, wherein the instructions are further configured to cause the at least one processor to perform operations including: transmitting a maintenance request from the HVAC control unit, wherein the remote server computing system is configured to create a maintenance job from the maintenance request, grant, the third party account access to the maintenance job; receive information associated with the maintenance job from the third party account; and receiving information associated with the maintenance job to be displayed on the user interface of the HVAC control unit.

In some aspects, the techniques described herein relate to a non-transitory computer storage media, wherein the instructions are further configured to cause the at least one processor to perform operations including: transmitting operational data associated with operation of the HVAC system; receiving alert data from the server computing system, wherein the alert data is generated based on the operational data; and automatically causing the alert data to be displayed on a graphical user interface screen.

Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 2B illustrates a block diagram depicting example functionality of the customer management system 150 providing a marked device notification.

FIG. 6C illustrates an example GUI 660 for configuring the brightness of a backlight of the control unit 104.

FIG. 6D illustrates an example GUI 680 for sending a maintenance request from a control unit 104.

FIGS. 7A-7B and 8A-8B illustrate example GUIs for utilizing various functions of the customer management system 150.

FIG. 8A illustrates an example GUI for a message center 800.

FIG. 8B illustrates an example message pattern GUI 850.

DETAILED DESCRIPTION

Overview

Figure 1:
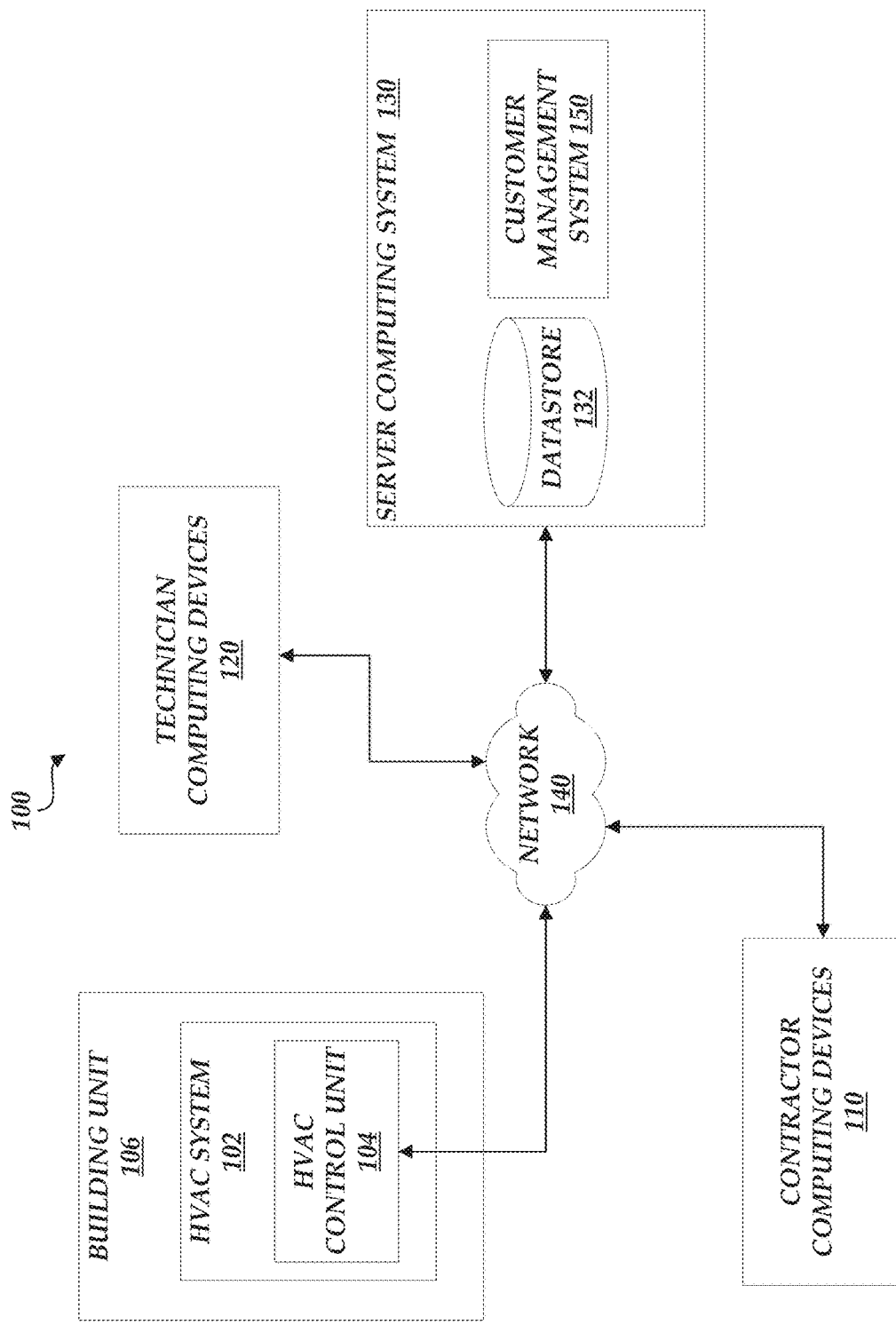
FIG. 1 illustrates an embodiment of a computing environment 100 for implementing a customer management system 150.

Described herein is a customer management system that can be used in association with installation, monitoring, and maintenance of heating, ventilation, and air conditioning ("HVAC") systems. HVAC systems can include one or more HVAC control units. The HVAC control unit can be referred to herein as a control unit, thermostat, or thermostat unit. The control unit can be configured to control the operation of the of the HVAC system. HVAC systems can be installed in buildings, such as in residential home buildings and commercial buildings, and provide climate control for the building.

The control unit can be provided according to one or more embodiments of systems, methods, computer program products, and related business methods for controlling one or more HVAC systems. Each thermostat unit can be configured to provide HVAC control functionality. The term "thermostat" is used hereinbelow to represent a particular type of control that is particularly applicable to temperature control in an in a building unit. The HVAC control unit can have control functionality over measurable characteristics other than temperature (e.g., pressure, flow rate, power, etc.) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy. Each control unit includes a user-interface component that a user can use to navigate through and select between selection options (e.g., to set a temperature setpoint or identify preferences). For example, a user may identify a setpoint temperature value for a desired temperature. The user-interface component may be an electronic display that can alphanumeric and graphical representations of data associated with the control unit. The user may be able to view and/or navigate through a menu system. For example, a user may scroll through selection options and select an option by using one or more inputs. Each control unit can be configured to provide a layered functionality, such that users (e.g., homeowners) and contractors can utilize different functionalities associated with the control unit. The layered functionality of the control unit allows it to be effective for a variety of different technological circumstances in home and business environments.

It is to be further appreciated that while the terms user, customer, installer, contractor homeowner, occupant, guest, tenant, landlord, repair person, and the like may be used to refer to the person or persons who are interacting with the control unit or other device or user interface in the context of processes described herein, these references are by no means to be considered as limiting the scope of the present teachings with respect to the person or persons who are performing such actions. HVAC contractors ("contractors") can install and/or maintain HVAC systems in buildings. HVAC systems can require various services to maintain the HVAC system. For example, HVAC systems may require filters to be changed, air conditioning units ("A/C") to be recharged, HVAC system cleaning, and the like to maintain the HVAC system.

It is to be appreciated that although exemplary embodiments are presented herein for the particular context of HVAC control system, there are a wide variety of other resource usage contexts for which the embodiments are readily applicable including, but not limited to, water usage, air usage, the usage of other natural resources, and the usage of other forms of energy, as would be apparent to the skilled artisan in view of the present disclosure. Therefore, such application of the embodiments in such other resource usage contexts is not outside the scope of the present teachings.

Overview of Computing Environment

FIG. 1 illustrates an embodiment of a computing environment 100 for implementing a customer management system 150. The environment 100 can include a network 140, building unit(s) 106, HVAC system 102, a server computing system 130, technician computing devices 120, and contractor computing devices 110. The server computing system 130 may communicate via the network 140 with the HVAC systems 102, technician computing devices 120, and contractor computing devices 110. Although only one network 140 is illustrated, multiple distinct and/or distributed networks 140 may exist. The network 140 can include any type of communication network. For example, the network 140 can include one or more of a wide area network (WAN), a local area network (LAN), a cellular network, an ad hoc network, a satellite network, a wired network, a wireless network, and so forth. In some embodiments, the network 140 can include the Internet.

Building Unit

The building unit 106 can be residential homes, such as a single-family houses, duplexes, townhomes, multi-unit apartment buildings, hotels, retail stores, office buildings, industrial buildings, and generally any living space or workspace having one or more HVAC systems 102.

HVAC System

The HVAC systems 102 associated with one or more building HVAC units. The HVAC systems 102 can include one of more control units 104. The HVAC system 102 can provide heating, cooling, ventilation, and/or air handling for an enclosure, such as the building unit 106. The HVAC system 102 can be a forced air type heating system, although according to other embodiments, other types of systems could be used. The HVAC system 102 can be selectively actuated via control electronics that communicate with the control unit 104. In heating, heating coils or elements within air handler provide a source of heat using electricity or gas. Cool air can be heated by heating coils or elements. The heated air can flow into one or more locations within the building unit 106. For a heating mode, when control unit 104 can determine that an ambient temperature is below a lower threshold value equal to a setpoint temperature, a heating cycle can be actuated until the ambient temperature rises to an upper threshold value equal to the setpoint value. In cooling, a set of heat exchanger coils can cool the gas and circulate the cooled air through the building unit 106. In a cooling mode, when control unit 104 determines that an ambient temperature is above an upper threshold value equal to a setpoint temperature, the cooling cycle will be actuated until the ambient temperature lowers to a lower threshold value equal to the setpoint value.

Although not shown, the HVAC system(s) 102 include components used in providing climate control to the building unit 106, such as air conditioning units, heating units, ducting, fans, filters, pumps, power converters, temperature sensors, and the like, that would be known to someone of skill in the art. Each HVAC system 102 includes one or more control units 104 used to monitor and control the HVAC system.

HVAC Control Unit

The HVAC control unit 104 can include components for controlling HVAC systems 102, such as computer processors, controllers, memories, connectors, and the like. For example, the control unit 104 can send control signals to control operation of various components of an HVAC system 102, such as air conditioning units, heating units, and/or fans, on and off. A control unit 104 can monitor HVAC systems 102. The control unit 104 can receive signals from an HVAC system 102 and process and store the signals in memory. For example, the control unit 104 may determine the state of an HVAC system 102, determine the temperature of a building an HVAC system 102 is installed in, determine a rate of change of temperature for an HVAC system 102, determine the efficiency of an HVAC system 102, and the like.

The control unit 104 may include hardware and software components for establishing communications over a communication network 140. For example, the user computing system 102 may be equipped with networking equipment and network software applications that facilitate communications via one or more networks (for example, the Internet or an intranet). The control unit 104 can communicate with server 130, via network 140, to interact with the customer management system 150.

The control unit 104 can include one or more user interfaces, such as graphical user interfaces ("GUIs"), to display information to users and to receive user input. For example, the control unit 104 may include GUIs to display the current state of the HVAC system 102, display one or more messages or notifications to a user, receive user input, etc. The control unit 104 may include input functionality for receiving user input, such as a buttons, dials, slides, touch screens, and the like.

The control unit 104 comprises physical hardware and firmware configurations, along with hardware, firmware, and software programming that is capable of carrying out the functionalities described explicitly herein. In view of the instant disclosure, a person skilled in the art would be able to realize the physical hardware and firmware configurations and the hardware, firmware, and software programming that embody the physical and functional features described herein without undue experimentation using publicly available hardware and firmware components and known programming tools and development platforms. Similar comments apply to described devices and functionalities extrinsic to the control unit 104, such as devices and programs used in remote data storage and data processing centers that receive data communications from and/or that provide data communications to the control unit 104.

Contractor Computing Devices

FIG. 1 illustrates exemplary contractor computing devices 110 associated with one or more contractors. A contractor computing device 110 may include hardware and software components for establishing communications over a communication network 140. For example, the contractor computing device 110 may be equipped with networking equipment and network software applications (for example, a web browser) that facilitate communications via one or more networks (for example, the Internet or an intranet). The contractor computing device 110 may have varied local computing resources such as central processing units (CPU) and architectures, memory, mass storage, graphics processing units (GPU), communication network availability and bandwidth, and so forth. Further, the contractor computing device 110 may include any type of computing system. For example, the contractor computing device 110 may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. The specific hardware and software components of the contractor computing device 110, are referred to generally as computing resources.

The contractor computing device 110 can communicate with server 130, via the network 140, to interact with the customer management system 150. For example, the contractor computing device 110 can interact with the customer management system 150 to update the contractor account, update services, communicate information, etc.

Technician Computing Devices

FIG. 1 illustrates exemplary technician computing devices 120 associated with one or more technician. A technician computing device 120 may include hardware and software components for establishing communications over a communication network 140. For example, the technician computing device 120 may be equipped with networking equipment and network software applications (for example, a web browser) that facilitate communications via one or more networks (for example, the Internet or an intranet). The technician computing device 120 may have varied local computing resources such as central processing units (CPU) and architectures, memory, mass storage, graphics processing units (GPU), communication network availability and bandwidth, and so forth. Further, the technician computing device 120 may include any type of computing system. For example, the technician computing device 120 may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. The specific hardware and software components of the technician computing device 120, are referred to generally as computing resources.

The technician computing device 120 can communicate with server 130, via the network 140, to interact with the contractor management system 150. For example, the technician computing device 120 can interact with the technician management system 150 to verify a HVAC control unit 104, receive service detail, communicate other information, etc.

Server Computing System

The server computing system 130 that may include a datastore 132 and customer management system 150. The server 130 can include one or more computing devices, such as servers and databases for managing the various customer and contractor services described herein. The datastore 132 can include databases, local memory, cloud memory, and the like, for storing customer and contractor information.

The server computing system 130 can include one or more application host systems, such as the customer management system 150 and data source(s), such as the datastore 132. The server computing system 130 may include one or more computing systems configured to execute at least a portion of the customer management system 150. In some embodiments, the one or more application host systems can include one or more computing devices, such as servers and databases that may host and/or execute a portion of one or more instances of the customer management system 150. In certain embodiments, instead of or in addition to executing a portion of the customer management system 150, the application host systems may execute another application, which may complement and/or interact with the customer management system 150 during execution of an instance of the customer management system 150 by the contractor computing device 110 and/or by the technician computing device 120. In some embodiments, the contractor computing device 110 may use the customer management system 150 to communicate with the control unit 104 and/or the technician computing devices 120.

The server computing system 130 may run on a variety of computing devices, such as a server, a Windows server, a Structure Query Language server, a Unix Server, a personal computer, a laptop computer, a smart phone, a personal digital assistant, a tablet, and so forth. Servers may include a variety of servers such as database servers (for example, Oracle, DB2, Informix, Microsoft SQL Server, MySQL, or Ingres), application servers, data loader servers, or web servers. In addition, the servers may run a variety of software for data visualization, distributed file systems, distributed processing, web portals, enterprise workflow, form management, and so forth. In other embodiments, the server computing system 130 may run on a cluster computer system, a mainframe computer system and/or other computing system suitable for controlling and/or communicating with large databases, performing high volume transaction processing, and generating reports from large databases. The computing system 1202 is generally controlled and coordinated by an operating system software, such as Windows XP, Windows Vista, Windows 7, Windows 8, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

Access to the customer management system 150 by the contractor computing devices, the technician computing devices, and/or by data sources, such as datastore 132, may be through a web-enabled user access point. The contractor computing devices 150 and technician computing devices may have a browser module that is implemented as a module that uses text, graphics, audio, video, and other media to present data and to allow interaction with data via the network 140.

The server computing system 130 may include one or more internal and/or external data sources (for example, datastore 132). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Caché), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MogoDB Atlas, Amazon Aurora, Amazon DynamoDB, Amazon Redshift, Amazon ElastiCache, Amazon MemoryDB for Redis, Amazon DocumentDB, Amazon Keyspaces, Amazon EKS, Amazon Neptune, Amazon Timestream, or Amazon QLDB), a non-relational database, or a record-based database.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL ca specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

Customer Management System

A customer management system 150 can provide the various customer and contractor services described herein. The customer management system 150 can provide application programming interfaces ("APIs") for interfacing with HVAC control units 104, technician computing devices 120, and contractor computing devices 110. The APIs can allow for users (e.g., customers, technicians, and contractors) to communicate and receive information associated with the services.

FIGS. 2A-2B, FIG. 3, FIGS. 4A-4B, and FIG. 5 illustrate block diagrams depicting example functionality of the customer management system 150. The customer management system 150 can be in communication with contractor computing devices 110, with technician computing devices 120, and with HVAC control units 104. The functions described in association with FIGS. 2A-2B, FIG. 3, FIGS. 4A-4B, and FIG. 5 can be performed in a different sequence, can be added to, merged, or removed altogether.

Example of Device Verification

Figure 2A:
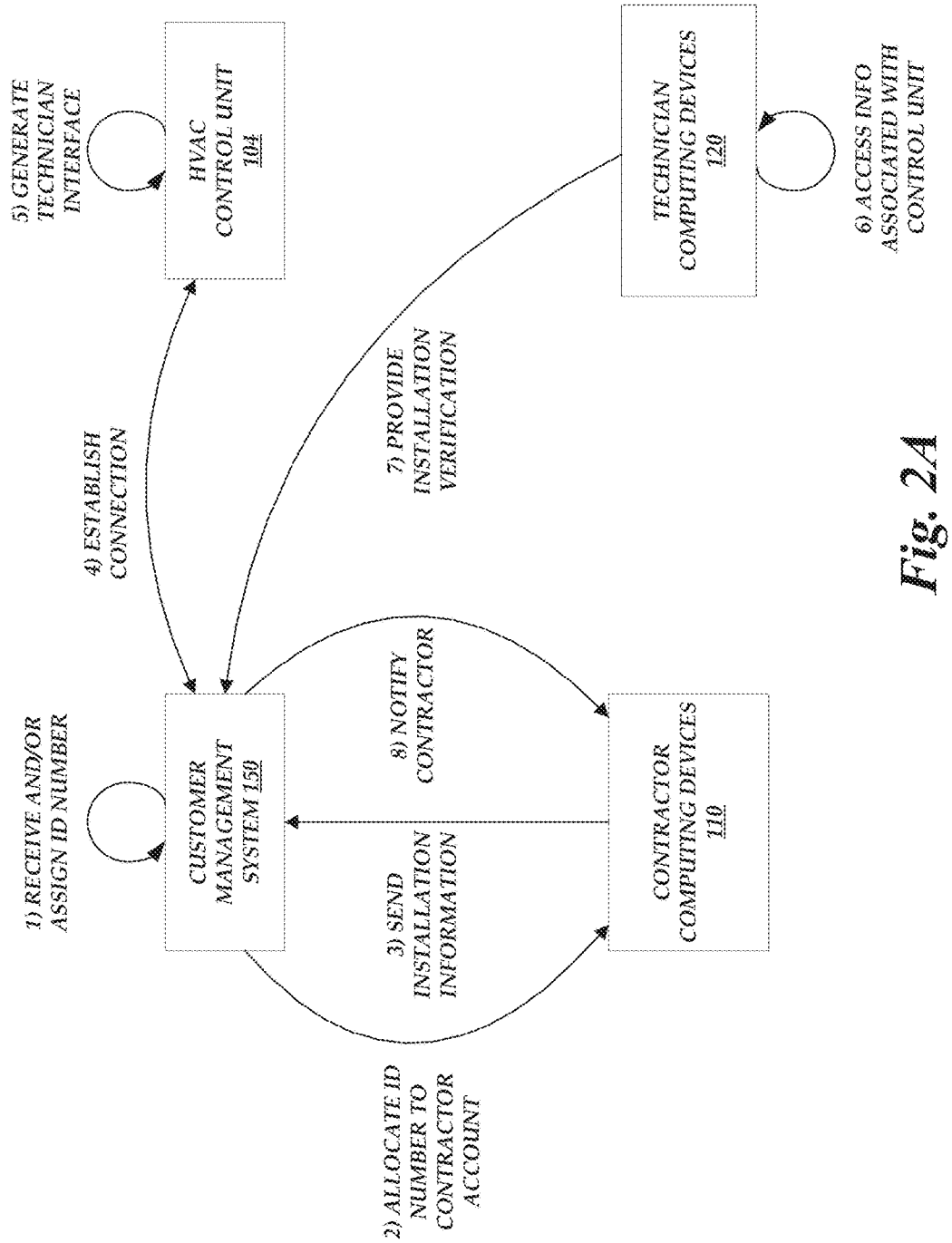
FIG. 2A illustrates a block diagram depicting example functionality of the customer management system 150 providing installed device verification.

FIG. 2A illustrates a block diagram depicting example functionality of the customer management system 150 providing installed device verification. In certain embodiments, functions, acts, or events described in FIG. 2A can be performed in a different order or concurrently.

At (1), the customer management system 150 can receive and/or assign identification numbers to control units 104. The identification numbers can be unique identification numbers. For example, the customer management system 150 can associate serial numbers generated during production to each of the HVAC control units 104. The unique identification numbers can be tracked by the customer management system 150 and stored in a database of identification numbers in the datastore 132.

At (2), the customer management system 150 can allocate identification numbers to contractor accounts. For example, the customer management system 150 can allocate each of the unique identification numbers assigned to a batch of HVAC control units that a contractor purchases to an account associated with the contractor. The customer management system 150 can store the allocation in datastore 132. A user can access information for each unique identification number allocated to the contractor through the contractor computing device 110. For example, the contractor computing device 110 can access an application, such as an application installed locally on the contractor computing device 110 or a web-based application, that interfaces with the customer management system and allows the contractor to access and designate information associated with control units allocated to the contractor.

At (3), the customer management system 150 can receive information from a contractor computing device 110 that a control unit 104 is to be installed at a building unit 106. For example, the contractor computing device 110 can access the customer management system 150 and indicate that the identification number of a HVAC control unit is to be installed. The information can include information associated with the installation of the control unit 104, such as a location (e.g., an address) of the building unit 106 where the control unit is to be installed. The information may additionally include billing information associated with a customer. The customer management system 150 can store the installation information associated with the identification numbers in the datastore 132 along with any additional information associated with the identification numbers.

At (4), a control unit 104 and the customer management system 150 can establish a connection. For example, a user interface of a newly installed control unit 104 may prompt a technician to establish a network connection. Once a network connection is established, the control unit 104 may automatically connect with the customer management system 150 and exchange information with the customer management system 150. For example, the control unit 104 can provide its associated identification number and the customer management system 150 can use the identification number of the control unit 104 to authenticate the HVAC control unit on the customer management system 150.

At (5), a control unit 104 can generate a technician interface. For example, once a newly installed control unit 104 is authenticated by the customer management system 150, the control unit 104 can receive information, such as the installation information associated with the control unit 104. The control unit 104, can use the information to generate the technician interface that can be used to set up the control unit 104. For example, the control unit 104 can generate a link, barcode, QR code, and/or the like that a technician can use to set up the control unit 104. The control unit 104 can display the technician interface on a user interface of the control unit 104, such as a GUI.

At (6) the technician computing device 120 can access information associated with the control unit 104 based on information provided by the technician interface. For example, the technician computing device 120 may scan a QR code on the technician interface to follow a link embedded in the QR code. The QR code can connect the technician computing device 120 to the customer management system 150. For example, the technician computing device 120 may access a technician API on the customer management system 150.

At (7), the technician computing device 120 can send a verification of installation to the customer management system 150. For example, the technician computing device 120 can send details of the installation, such as details of the HVAC system 102 that the control unit 104 is installed in, information regarding the owner/end-user of the control unit 104, a job number associated with the installation, and the like. The customer management system 150 may also receive additional information associated with the newly installed control unit, such as the location of the installation and/or the location of the technician computing device 120, which can be based on GPS. The GPS location may be used to identify an address of the building unit, and/or verify that an address provided by the contractor matches the control unit location. For example, the customer management system 150 can compare the identification number and the address of the installation with the stored data provided by the contractor. If the identification number and the address of the installation does not match the stored list, the customer management system 150 can flag the identification number. The customer management system 150 may an identification of the contractor and/or technician associated with the installation of the control unit 104 with a contractor account the identification number is assigned to and flag any discrepancies.

At (8), the customer management system 150 can provide a notification associated with the installation to the contractor account. The notification may indicate that the installation has been successfully completed, that there is an alert, such as a flagged identification number, or other notification. For example, the customer management system 150 can notify the contractor account that an identification number has been installed and provide the location/address associated with the installation. The contractor account may receive an alert that a control unit has been flagged. For example, the installation location may not match information provided by the contractor. The contractor computing device 110 can access the customer management system 150 to resolve the alerts. For example, the contractor can correct the address so that the address of the installed control unit 104 matches the stored address associated with the identification number.

FIG. 2B illustrates a block diagram depicting example functionality of the customer management system 150 providing a marked device notification. In certain embodiments, functions, acts, or events described in FIG. 2B can be performed in a different order or concurrently. Moreover, the functions, acts, or events described in FIG. 2B can performed concurrently with the operations associated with FIG. 2A.

At (1), the contractor account can notify the customer management system 150 of a missing or otherwise marked device, such as a control unit 104. A control unit 104 may be marked because the control unit 104 was stollen or missing, previously replaced by warranty, previously installed in a different HVAC system 102, and/or the control unit 104 does not match any record in the customer management system 150. For example, the contractor computing device 110 can access the customer management system 150 and provide the identification number of a marked control unit 104. In some instances, the contractor may notify the customer management system 150 of a marked control unit 104 before indication is received that the marked control unit 104 was installed in an HVAC system 102, such as prior to process (8) of FIG. 2A. In other instances, contractor may notify the customer management system 150 of a marked control unit 104 after indication is received that the marked control unit was installed in an HVAC system 102, such as in response to process (8) of FIG. 2A. The customer management system 150 can store the identification number of the marked control unit 102 on the datastore 132.

At (2) the customer management system 150 can receive a notification that the marked control unit 104 has been activated. For example, the customer management system 150 can receive the identification number when the marked control unit 104 is activated and connected to a network. The control unit 104 can be configured to automatically communicate with the customer management system 150 and provide its identification number. In another example, at 2') the customer management system 150 can receive the identification number from a technician computing device 120 as described in process (7) of FIG. 2A. The customer management system 150 can compare the identification number of the activated control unit to the identification numbers stored on the datastore 132 in order to determine a status associated with the control unit 104. If the identification number of the activated control unit matches the identification number of a control unit 104 that is marked, the customer management system 150 can perform a defined action, such as notify the contractor account and/or disable the activated control unit 104.

At (3), the customer management system 150 can provide an alert or other notification indicating the marked control unit 104 has been installed in an HVAC system 102. For example, the customer management system 150 can generate a notification in the contractor account that the marked control unit 104 has been installed and provide the address associated with the installation.

Maintenance Request Services

Figure 3:
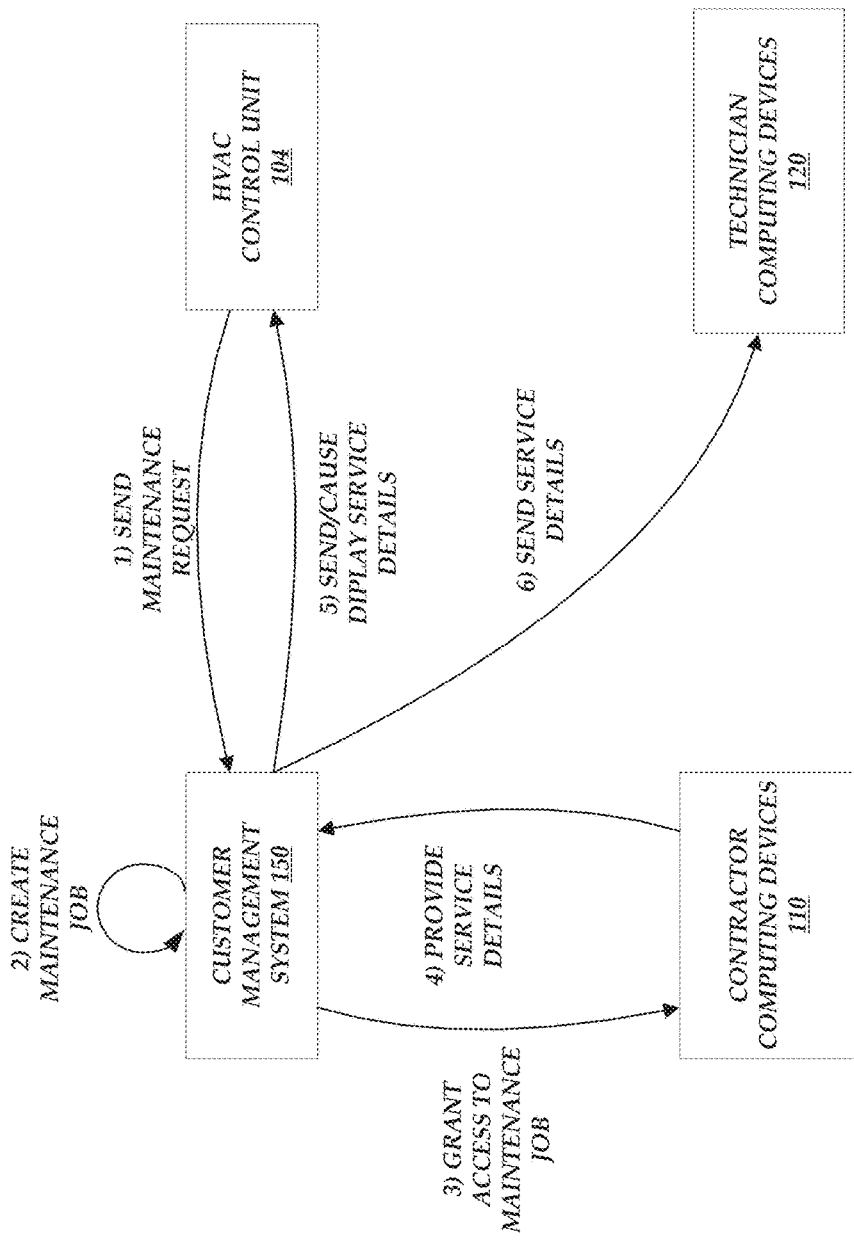
FIG. 3 illustrates a block diagram depicting example functionality of the customer management system 150 providing a direct maintenance request.

FIG. 3 illustrates a block diagram depicting example functionality of the customer management system 150 for generating a maintenance request associated with an HVAC control unit 104. In certain embodiments, functions, acts, or events described in FIG. 3 can be performed in a different order or concurrently.

At (1), the customer management system 150 can receive a maintenance request from a control unit 104. For example, the control unit 104 can display a maintenance request interface, such as GUI 680 of FIG. 6D, that allows a user to generate a maintenance request. The user may manually navigate to the maintenance request interface 680 on the control unit 104. In some embodiments, the customer management system 150 can cause the maintenance request interface to be displayed on the control unit 104 based on a request from another source, such as a contractor computing device 110 or another computing device. The maintenance request may be automatically generated based on a defined maintenance schedule.

At (2), the customer management system 150 creates a maintenance job. For example, the customer management system 150 can generate a maintenance job and store the maintenance job in the datastore 132. The maintenance job can include maintenance job source information, such as a unique identification number of a control unit 104 associated with the maintenance job, the address of the location associated with the maintenance job, the customer's name associated with the maintenance job, and/or the service requested for the maintenance job. The maintenance job can also include maintenance job designation information, such as a contractor associated with the maintenance job. The contractor associated with the maintenance job can be determined based on preferences associated with the control unit 104. The preferences may be user defined or contractor defined.

At (3), the customer management system 150 grants a contractor computing device 110 access to the maintenance job. For example, the customer management system 150 can provide access to the contractor account assigned to the maintenance job. The customer management system 150 can allow the contractor account to receive and designate information associated with the maintenance request. A contractor computing device 110 with access to the maintenance request can access and/or update the maintenance job source information, the maintenance job designation information, and other information associated with request.

At (4), the customer management system 150 receives service details from the contractor computing device 110. For example, the contractor computing device 110 can access the customer management system 150 and provide service details for the maintenance job. The service details can include an identification of technician(s) assigned to perform the maintenance job, cost estimates for the maintenance job, the scheduled date and time for the maintenance job, date and time when the maintenance request was received, estimated/actual costs associated with maintenance request, and other information associated with the request. The customer management system 150 can store the service details in the datastore 132.

At (5), the customer management system 150 can provide at least a portion of the service details to the control unit 104 for display to a user. For example, all, or a portion of, the service details can display on a UI of the control unit 104 such as the identification of the technician(s) to perform the maintenance job, cost estimates for the maintenance job, and/or the date and time for the maintenance job. In some embodiments, the service information is sent directly to the customer. For example, all, or a portion of, the service details can be sent directly to the customer through SMS messaging, email, and/or the like. In another example, the customer may access a customer specific interface on the customer management system 150 and access at least a portion of the service details, such as on a web browser of a computing device.

At (6), the customer management system 150 can provide at least a portion of the service details to the technician computing devices 120 associated with the technician(s) assigned to perform the maintenance job. For example, the technician computing devices 120 may be sent the location of the job, the scheduled date and time for the maintenance job, the service requested for the maintenance job, cost estimates for the maintenance job. In some embodiments, the service information is sent directly to the technician and/or the technician computing devices 120. For example, all, or a portion of, the service details can be sent directly to the technician computing devices 120 through SMS messaging, email, and/or the like. In another example, the technician may access a technician specific interface on the customer management system 150 and access at least a portion of the service details, such as on a web browser of a technician computing device 120.

Figure 4A:
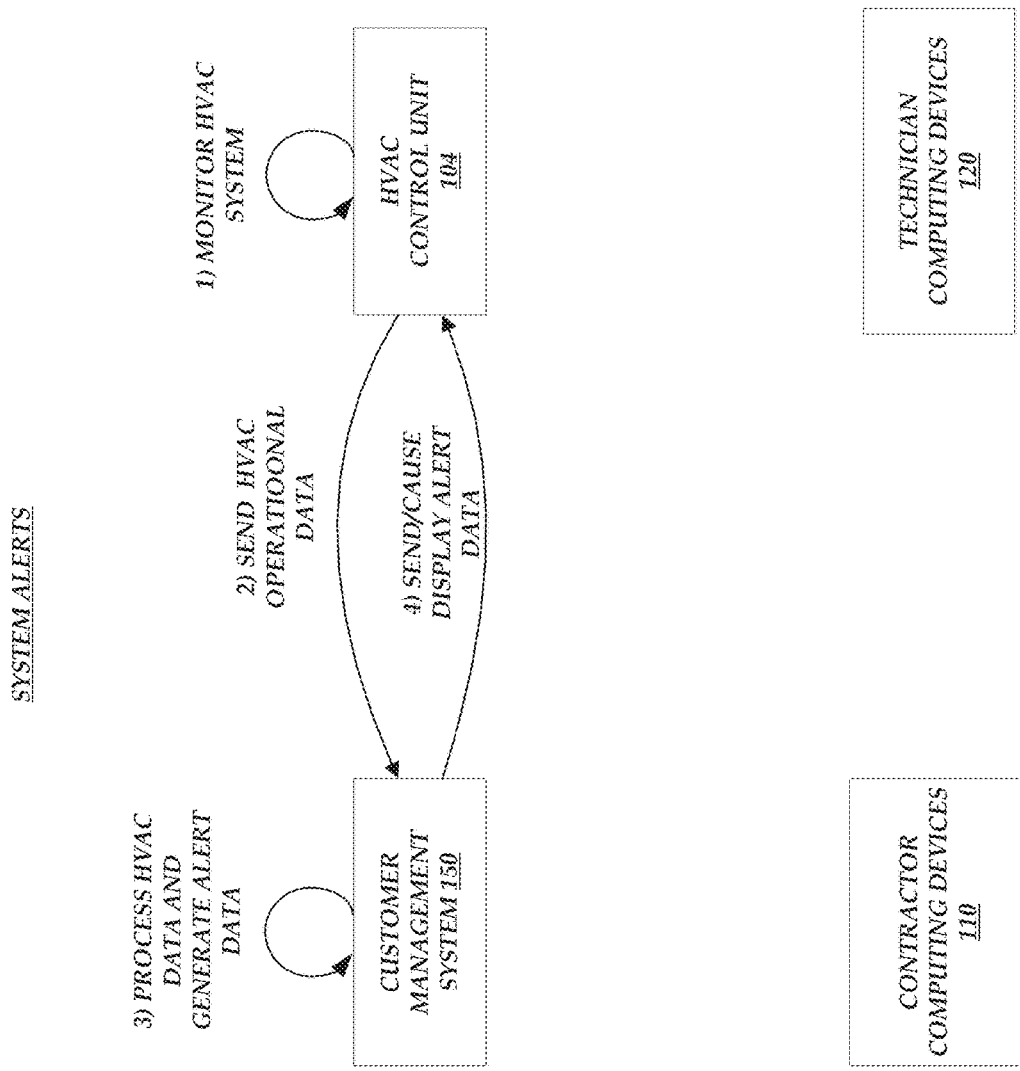
FIG. 4A illustrates a block diagram depicting example functionality of the customer management system 150 providing system alerts services.

System Alert and Notification Services:

FIG. 4A illustrates a block diagram depicting example functionality of the customer management system 150 providing system alerts services. In certain embodiments, functions, acts, or events described in FIG. 4A can be performed in a different order or concurrently.

At (1), the control unit 104 monitors the HVAC system. For example, the HVAC system can include various sensors to collect HVAC operational data. The HVAC operational data can include information regarding the operation of the HVAC system, such as temperature readings, humidity readings, air pressure readings, ambient light readings, motion detection readings, rates of temperature change, operation time, power draw, temperature change while HVAC system is dormant, air quality readings (e.g., $CO2e$ readings), and/or any information useful in determining the operating status and/or efficiency of an HVAC system. The HVAC operational data may also include information about the settings of the control unit 104, such as information regarding operation setting changes of the control unit 104. In some embodiments, the operational data may include information collected by the control unit 104 from third parties. For example, the operational data may include weather forecasts collected from a third party over the network.

At (2), the customer management system 150 receives the HVAC operational data from the control unit 104. The customer management system 150 can store the HVAC operational data in the datastore 132.

At (3), the customer management system 150 can process HVAC operational data and generate alert data. For example, the customer management system 150 may process the HVAC operational data and determine a status of the control unit 104, such as that the control unit 104 has malfunctioned (e.g., a sensor has malfunctioned, a reading is inconsistent, wiring of the control unit 104 is incorrect, etc.), the HVAC system 102 is performing below an efficiency threshold (e.g., the HVAC system 102 has failed to reach a set temperature in a threshold period of time), a filter change or other periodic maintenance is needed, air quality is below a threshold, the control unit 104 has lost network connection and/or other status indications for control unit 104. The alert data can include information associated with the status of the control unit 104. For example, if the customer management system 150 determines that control unit 104 has malfunctioned, the alert data may include information regarding the malfunction. Other examples of the alert data include information regarding a determined efficiency of the HVAC system associated with control unit 104, an indication that a filter has expired, a date that a filter is predicted to expire or of another periodic maintenance, an indication that ventilation should be used or installed, and/or information regarding other status indications for control unit 104.

At (4), the customer management system 150 sends the alert data to the control unit 104 and/or causes the control unit 104 to display the alert data. For example, all, or a portion of, the alert data can display on a UI of the control unit 104, such as an alert notification. An alert notification can include a title of the alert notification and/or a description of the alert notification, such as descriptions of needed maintenance, dates a filter is predicted to expire or of another periodic maintenance, an indication that ventilation should be used or installed, and/or descriptions regarding other status indications for control unit 104. In some embodiments, the alert data is sent directly to the customer. For example, all, or a portion of, the service details can be sent directly to the customer through SMS messaging, email, and/or the like. In another example, the customer may access a customer specific API on the customer management system 150 and access the alert data, such as on a web browser of a computing device.

Figure 4B:
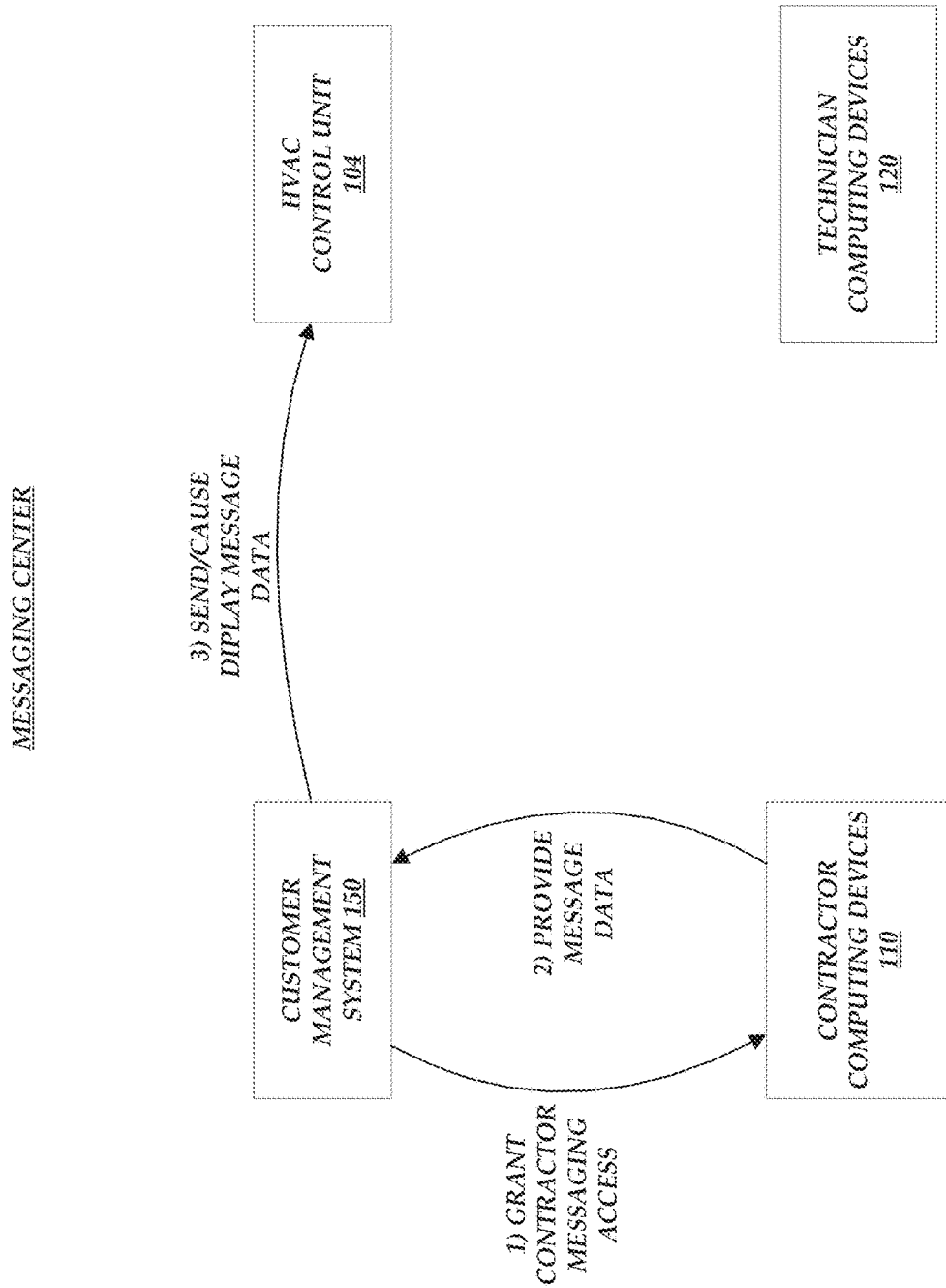
FIG. 4B illustrates a block diagram depicting example functionality of the customer management system 150 providing messaging services.

FIG. 4B illustrates a block diagram depicting example functionality of the customer management system 150 providing messaging services. In certain embodiments, functions, acts, or events described in FIG. 4B can be performed in a different order or concurrently.

At (1), the customer management system 150 grants a contractor account messaging access to a control unit 104. Granting the messaging access to the control unit 104 may occur when the unique identification number of the control unit 104 is allocated to a contractor account associated with the contractor computing device 110. In some embodiments, granting the contractor computing device 110 messaging access to the control unit 104 may occur in response to another event, such as the contractor associated with the contractor computing device 110 subscribing to a service, a user of the control unit 104 opting into a messaging subscription, a request by the contractor to receive messaging access to the control unit 104 and the like.

At (2), the customer management system 150 receives message data from the contractor computing device 110. For example, the contractor computing device 110 can access an API on the customer management system 150 and provide message data to be sent to the control unit 104. A contractor computing device 110 with messaging access can access and/or update the message data. The message data can include message information, such as text and image information to be displayed on the control unit 104, and message timing information, such as a date and time for the message to begin display and a length of time the message information is to be displayed on the control unit 104. For example, the message data can include customized marketing, personalized text, promotional offers, etc. to be displayed on the control unit 104.

At (3), the customer management system 150 sends the message data to the control unit 104 and/or causes the control unit 104 to display the message data. For example, all, or a portion of, the message data can display on a UI of the control unit 104. When the message data contains message timing information, the customer management system 150 can wait for a designated date and time prior to sending the message data to the control unit 104 and/or causing the control unit 104 to display the message data. The customer management system 150 and/or control unit 104 can cause the message data to stop displaying on the UI of the control unit 104 when the designated length of time the message information is to be displayed expires. In some embodiments, the customer management system 150 may also send the message data to one or more other devices such as to a mobile application on a mobile computing device, such as a phone or a laptop.

Figure 5:
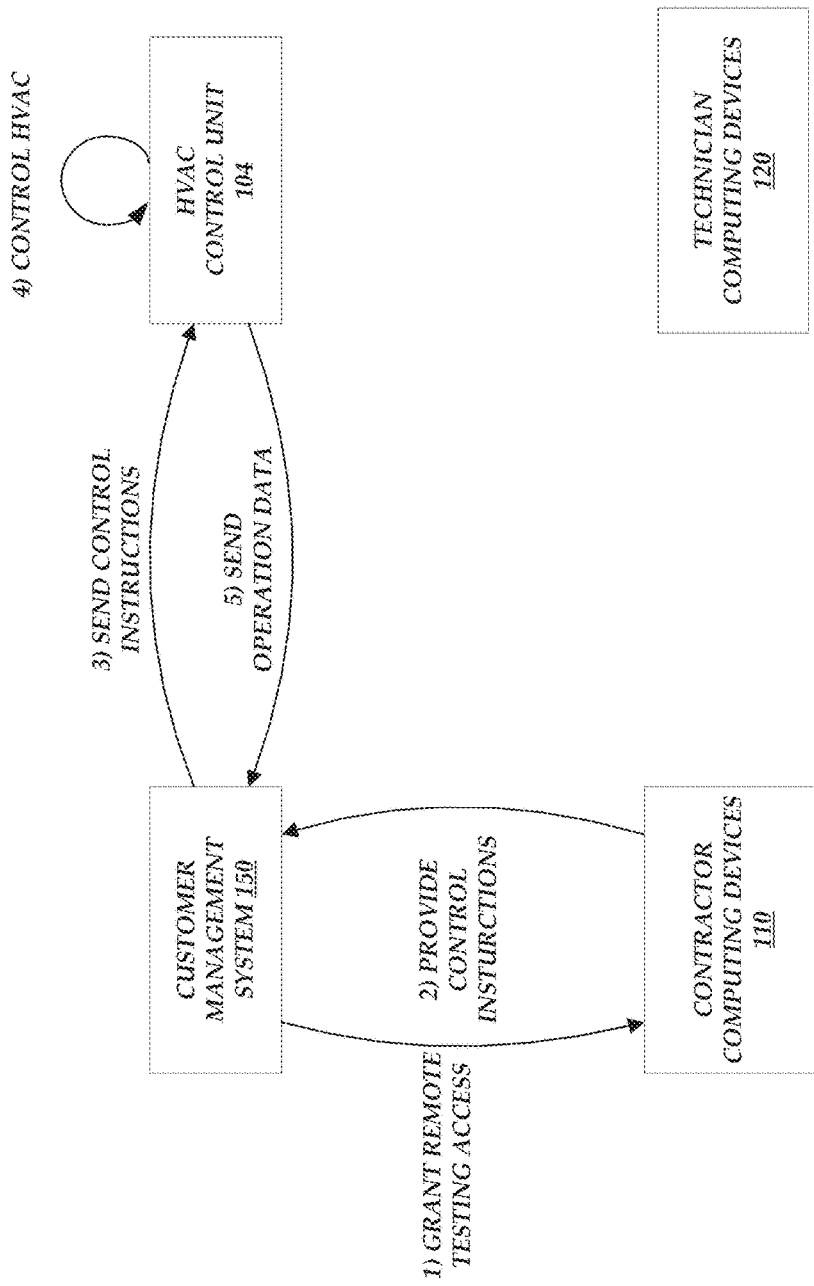
FIG. 5 illustrates a block diagram depicting example functionality of the customer management system 150 providing remote testing services.

Remote Testing Services:

FIG. 5 illustrates a block diagram depicting example functionality of the customer management system 150 providing remote testing services. In certain embodiments, functions, acts, or events described in FIG. 5 can be performed in a different order or concurrently.

At (1), the customer management system 150 grants a contractor computing device 110 remote testing access to a control unit 104. As a security check, the customer management system 150 may ensure that the contractor associated with the contractor computing device 110 has been allocated the unique identification number of the control unit 104, as is described in FIG. 2A, prior to granting the contractor computing device 110 remote testing access. In some embodiments, granting the contractor computing device 110 remote testing access to the control unit 104 may occur in response to another event, such as a contractor or a user subscribing to a service, a user of the control unit 104 opting into remote testing, a request by the contractor to receive remote testing access to the control unit 104, and the like.

At (2), the customer management system 150 receives control instructions from the contractor computing device 110. For example, the contractor computing device 110 can access the customer management system 150 and provide control instructions to be sent to the control unit 104. A contractor computing device 110 with remote control access can access and/or update the control instructions. The control instructions can include a set of operations for the control unit 104 and/or the HVAC system associated with the control unit 104 to perform. For example, the HVAC system associated with the control unit 104 may have been dormant for a period of time (e.g., for a period of months during the spring season) and the set of operations may include an instruction to run the HVAC for a continuous period of time.

At (3), the customer management system 150 sends the control instructions to the control unit 104. The customer management system 150 can convert the control instructions into executable instructions for the control unit 104. The customer management system 150 can generate computer-executable code from the control instructions and send the computer-executable code to the control unit 104. For example, an instruction to run the HVAC for a continuous period of time may be converted into computer-executable code configured to cause one or more hardware processors of the control unit 104 to control an HVAC to run for the continuous period of time.

At (4) the control unit 104 controls the HVAC system associated with the control unit 104 based on the control instructions. The control unit 104 can utilize one or more hardware processors to execute the computer-executable code and control the HVAC. For example, the control unit 104 can utilize one or more hardware processors to run the aforementioned computer-executable code configured to control an HVAC system to run for the continuous period of time. The control unit 104 can collect operation data during the execution of the control instructions. For example, while running the HVAC system for the continuous period of time, the control unit 104 can collect operational data. The operational data can include information regarding the operation of the HVAC system, such as temperature readings, humidity readings, air pressure readings, ambient light readings, motion detection readings, rates of temperature change, operation time, power draw, temperature change while HVAC system is dormant, air quality readings (e.g., CO2e readings), and/or any information useful in determining the operating status and/or efficiency of an HVAC system.

At (5), the customer management system 150 receives the operation data from the control unit 104. The operation data can be stored in datastore 132 and accessed by a contractor computing device 110 and/or the control unit 104. The customer management system 150, the contractor computing device 110, and/or the control unit 104 may utilize the operation data to determine a status of an HVAC system. For example, the customer management system 150, the contractor computing device 110, and/or the control unit 104 may utilize the operation data and determine that the HVAC system needs maintenance prior to operation during a peak season. Other examples of potential determined statuses of an HVAC system include the HVAC system is operating normally, the HVAC system needs a filter changed, the HVAC is running inefficiently, the HVAC system is inoperable, etc.

In some embodiments, the customer management system 150 may automatically determine the status of an HVAC system using one or more machine learning models. The customer management system 150 may improve the models using collected data (e.g., continuously collected and stored operational data and previously determined status of HVAC systems). For example, the collected data may be used to retrain the models.

In some embodiments, the status of the HVAC system is sent to a contractor and/or a user of the control unit 104. For example, the status may be indicated on an API on the customer management system 150, accessible by the contractor computing device 110 or the control unit 104.

Example Embodiments of Control Unit GUIs

Figure 6B:
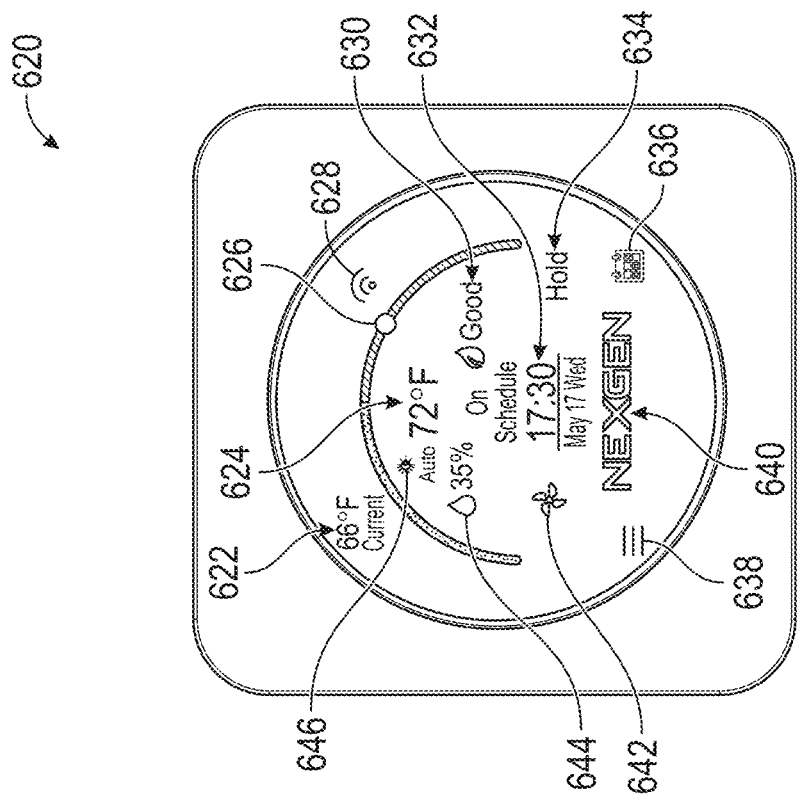
FIG. 6B illustrates an example GUI 620 providing a home view of the control unit 104.
Figure 6A:
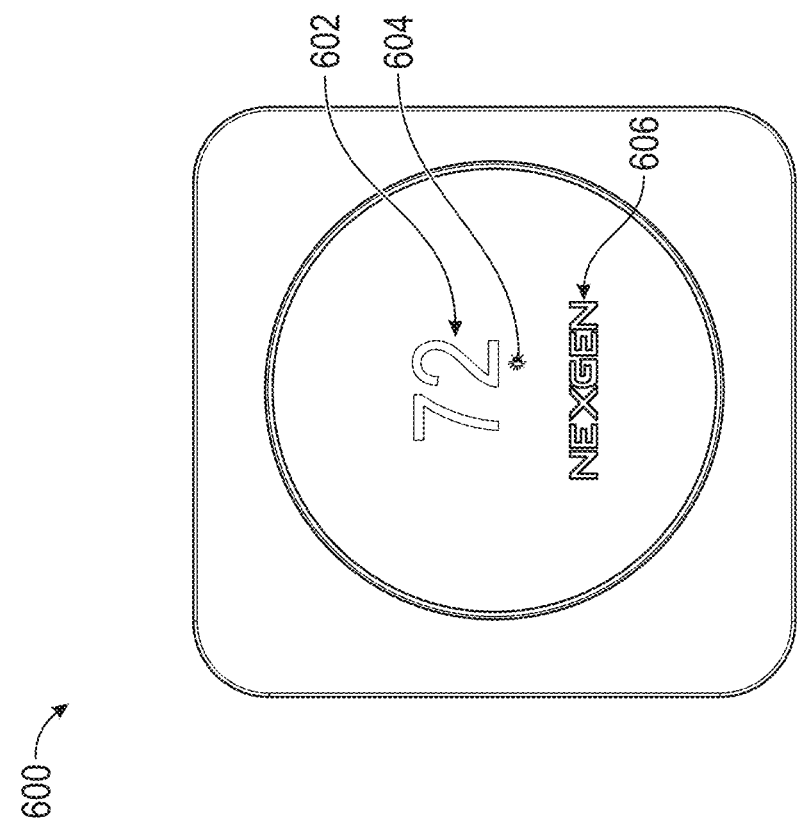
FIG. 6A illustrates an example GUI 600 providing a summary view of the control unit 104.

FIGS. 6A-6D illustrates example GUIs that can be displayed on an embodiment of a control unit 104, such as a thermostat, and used to receive one or more user inputs (e.g., from a touchscreen of the thermostat). FIG. 6A illustrates an example GUI 600 providing a summary view of the control unit 104. GUI 600 can be used to provide a summary of the current state of the HVAC system associated with the control unit 104. In some embodiments, GUI 600 is used as an idle screen. For example, the control unit 104 may automatically return to GUI 600 after a threshold amount of time passes with no user interaction. GUI 600 can include a temperature reading 602 that indicates the current temperature of the building the control unit 104 is installed in. GUI 600 can include operation mode symbol 604 that indicates the current operation mode the control unit 104 is in. In the illustrated example, operation mode symbol 604 indicates the thermostat is in an "auto" operation mode (the thermostat is configured to automatically heat or cool the building based on the current state and the set temperature). Other examples of operation modes that can be indicated by the operation mode symbol 604 include, a heating mode, a cooling mode, a fan on mode, a system off mode, a hold mode, to name a few. GUI 600 can include a contractor identifier 606. The contractor identifier 606 can display a name and/or logo for the contractor associated with the thermostat.

FIG. 6B illustrates an example GUI 620 providing a home view of the control unit 104. GUI 620 can be used to view and/or select various configurations for a control unit 104. GUI 620 can include a current temperature indicator 622 that indicates the current temperature of the building the control unit 104 is installed in. GUI 620 can include a set temperature 624 that indicates the set target temperature for the building the control unit 104 is installed in. GUI 620 can include a temperature selection tool 626. A user can then use the temperature selection tool 626 to change the set temperature 622. For example, the temperature selection tool 626 can be used to increase or decrease the set temperature 624.

GUI 620 can include operation mode indicator 646 that indicates the current operation mode the control unit 104 is in and allows a user to select an operation mode. The operation mode can instruct the control unit 104 of how to operate given the set temperature 624 and current temperature indicator 622. In the illustrated example, the operation mode indicator 646 shows the control unit 104 is in an "auto" mode. The "auto" mode may instruct the control unit 104 to control a heating or A/C unit to turn on based on a difference in the set temperature 624 and current temperature indicator 622. In the illustrated example, the set temperature 624 is "72 degrees Fahrenheit" and the current temperature indicator 622 shows "66 degrees Fahrenheit." As such, the "auto" mode may instruct the control unit 104 to turn on a heating unit in the building. Other examples of operation modes can include a heating only mode, a cooling only mode, a hold mode, an off mode, and a fan on mode, to name a few.

GUI 620 can include an air quality indicator 630 that displays a determined air quality for the building the control unit 104 is installed in. The determined air quality can be determined by the control unit 104 or can be received, for example from the customer management system 150. In the illustrated example, the air quality indicator 630 is showing the HVAC system is operating with "good" air quality. The efficiency indicator 630 may display the other determined air quality, including a "bad" quality, a representative symbol, a letter grading, or a number scale, to name a few. The control unit 104 may present an alert or notification based on the air quality determination, such as a recommendation to ventilate, a recommendation that a ventilation system need be installed, a recommendation to change a filter, or other message and notification regarding the air quality of the building.

GUI 620 can include a status indictor 632. The status indictor 632 can include the current time and date. The status indicator 632 may also include other information such as an indication of whether the thermostat is running on a programed schedule.

GUI 620 can include signal indicator 628 that can display the current connection level of the control unit 104. For example, the signal indicator 628 can display the strength of a connected Wi-Fi signal to the LAN. Signal indicator 628 can be selected by a user to configure or reconfigure a connection. For example, a user can select signal indicator 628 to change the LAN the control unit 104 is connected to.

GUI 620 can include a fan settings selection 642. The fan settings selection 642 can allow a user to change the fan settings for the HVAC system the control unit 104 is installed in. Examples of fan settings include a low setting, a high setting, an off setting, and on setting, and an automatic setting, to name a few.

GUI 620 can include a contractor identifier 640. The contractor identifier 640 may display the same name and/or logo for the contractor associated with the thermostat as contractor identifier 606. The size of contractor identifier 640 and the size of contractor identifier 606 may differ.

GUI 620 can include a schedule selection 636. The schedule selection 636 may allow a user to set a schedule for the control unit 104 to run on. The schedule may configure the set temperature 624 to change based on time indicators set by the user in the schedule. For example, the schedule may change the set temperature 624 based on a time of day, day of the week, etc. The GUI 620 can include a hold selection 634. The hold selection 634 can allow a user to select whether to ren the set schedule for the control unit 104 or run the control unit 104 at a temperature set by the temperature selection tool 626.

GUI 620 can include a humidity indicator 644 that displays the current humidity of the building the control unit 104 is installed in. GUI 620 can include a menu selection 638. The menu selection 638 may allow a user to navigate to other GUIs of the control unit 104.

FIG. 6C illustrates an example GUI 660 for configuring the brightness of a backlight of the control unit 104. GUI 660 may include a color selection 662 that allows a user to select and/or change the color of the backlight. GUI 660 may include a brightness section 664 that allows a user to change the brightness of the backlight. GUI 660 may include a shade of white selection 668 that allows a user to select a white backlight and the shades (sometimes referred to as the "warmth") of the white backlight. GUI 660 may include a save selection 670 that saves the configuration of the color selection 662, brightness section 664, and white selection 668. In some embodiments the save selection 670 will exit the GUI 660 after saving the configurations.

FIG. 6D illustrates an example GUI 680 for sending a maintenance request from a control unit 104. GUI 680 can include a contractor identifier 682 that displays a name and/or logo for the contractor associated with the control unit 104. Contractor identifier 682 can be the same identifier as contractor identifier 606 and/or contractor identifier 640 or may differ (e.g., a difference in size or logo). GUI 680 can include a contact number 684 that displays a contact telephone number for the contractor associated with the control unit 104. GUI 680 can include a maintenance link 686. The maintenance link 686 can be configured to link a user to a user interface to enter details of a maintenance request, such as the maintenance request described in process (1) of FIG. 3. For example, maintenance link 686 can be a quick response code ("QR code") that allows a user of a smart phone device to navigate to a web browser-based user interface to enter details of a maintenance request. In some embodiments, maintenance link 686 the user to another location, such as the contractors home web page.

GUI 680 can include a maintenance request selection 688. The maintenance request selection 688 may allow a user to enter a maintenance request, such as the maintenance request described in process (1) of FIG. 3, directly from the control unit 104. The maintenance request selection 688 may be a single selection. For example, a user may only need to select maintenance request selection 688 and wait to be contacted by the contractor associated with the thermostat. The maintenance request selection 688 may navigate the user into another GUI to enter details of the maintenance request. In some embodiments, GUI 680 provides indication when a maintenance request has been accepted and/or details of the maintenance request, such as the service details described in process (5) of FIG. 3. In some embodiments, these service details are displayed on a different GUI of the control unit 104 or not displayed on the control unit 104 at all.

Example GUIs for Customer Management System

FIGS. 7A-7B and 8A-8B illustrate example GUIs for utilizing various functions of the customer management system 150. The example GUIs may be accessed from the contractor computing devices 110, for example using a web browser.

Figure 7A:
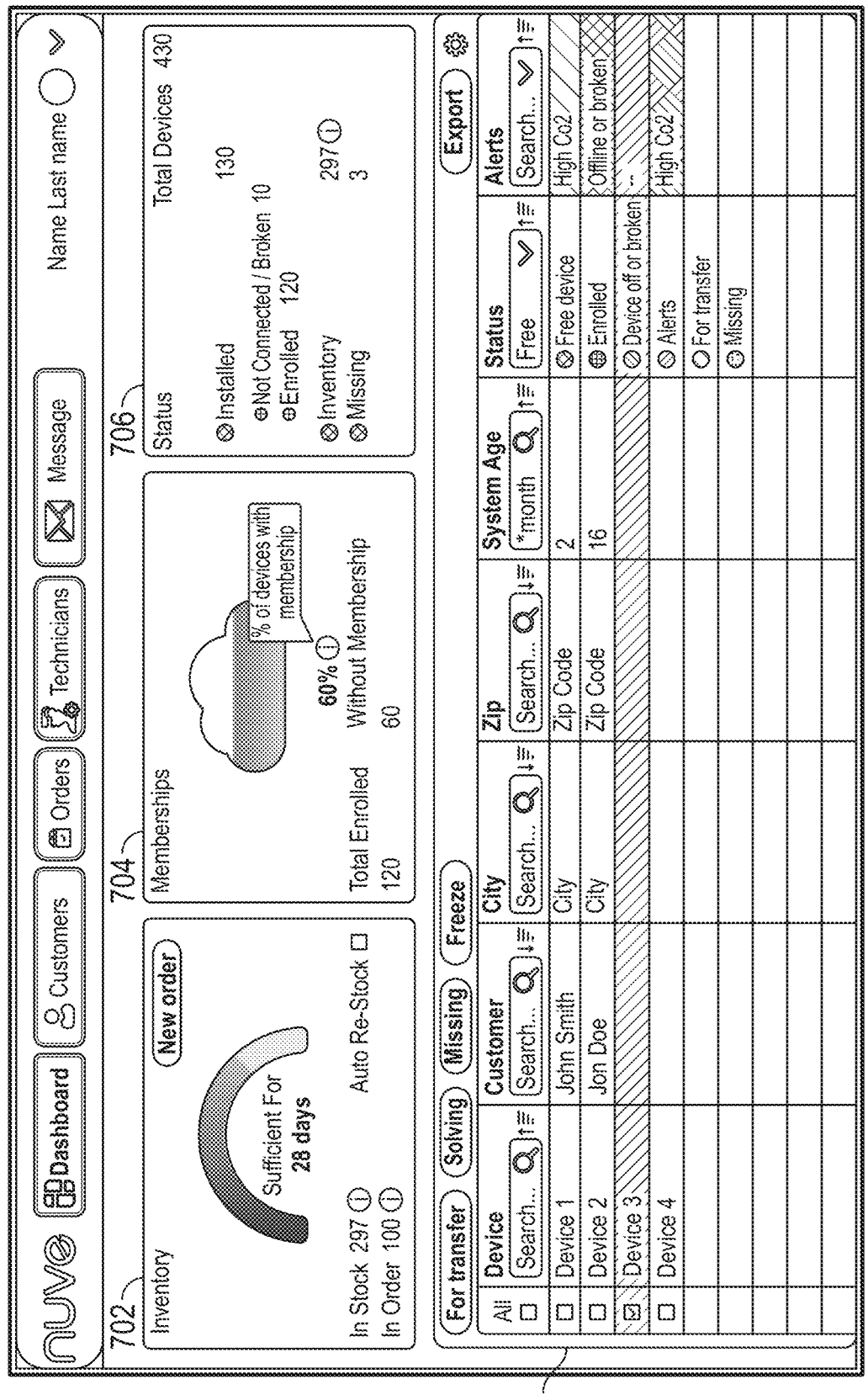
FIG. 7A illustrates an example GUI of a contractor dashboard 700.

FIG. 7A illustrates an example GUI of a contractor dashboard 700. The contractor dashboard 700 can include an inventory summary 702. The inventory summary 702 can include an indication of the number of uninstalled control unit currently in the contractor's inventory, an indication of the number of control units currently in order, an estimated time before the contractor will need to restock on control unit control unit, an option to auto restock control unit, a selection to place a new order of control unit, and/or other indications of a contractor's inventory.

The contractor dashboard 700 can include a membership summary 704. The membership summary 704 can include a summary of active memberships a contractor has sold to customers. The memberships may be subscriptions services the contractor offers customers, such as third party CRM systems, automatic maintenance schedules, restock services, and/or the like. The membership summary 704 can include an indication of the total enrolled memberships. The membership summary 704 can include an indication of the total devices without memberships and a percentage of devices with memberships.

The contractor dashboard 700 can include a status summary 706. The status summary 706 can include a summary breakdown of the status of the control unit assigned to the contractor. For example, the status summary 706 can include a count of total devices, a count of installed devices, including a count of devices that are broken or not connected, a count of devices in the contractor's inventory, and a count of missing devices, to name a few.

The contractor dashboard 700 can include a device listing 708. The device listing can include the unique identifier of each control unit that is allocated to the contractor with other identifying information associated with each control unit, such as a name of the customer for which a control unit was installed, locational information where the control unit was installed, the age of the HVAC system the control unit has been installed in, a status indicator for the control unit, an indication of any alerts generated for the control unit, or other types of information. The status indicator for the control unit can include that the control unit is free, the control unit is enrolled in a membership, the control unit is off or broken, the control unit has triggered an alert, the control unit is flagged for transfer, and the control unit is missing, to name a few. The alerts generated for the control unit can include an indication of high Co2 levels, that the control unit is offline or broken, the control unit is associated with an HVAC system running below a desired efficiency, and the control unit is associated with a filter change, to name a few. The device listing 708 may be searchable and/or include filters.

FIG. 7A illustrates an example GUI 750 for adding a contractor to the customer management system 150. GUI 750 may enable information regarding a contractor to be added to the customer management system 150 such as a contractor ID, name information, location information, tax information, website information, and/or contact information, to name a few. GUI 750 can be reconfigured to include more or fewer input fields depending on the desired information for contractors. GUI 750 may include an enable selection 752. The enable selection 752 may be required to be selected prior to the contractor becoming active in the customer management system 150. For example, a particular contractor may be unable to access the contractor dashboard 700 until the enable selection 752 has been selected for the particular contractor.

Figure 8A:
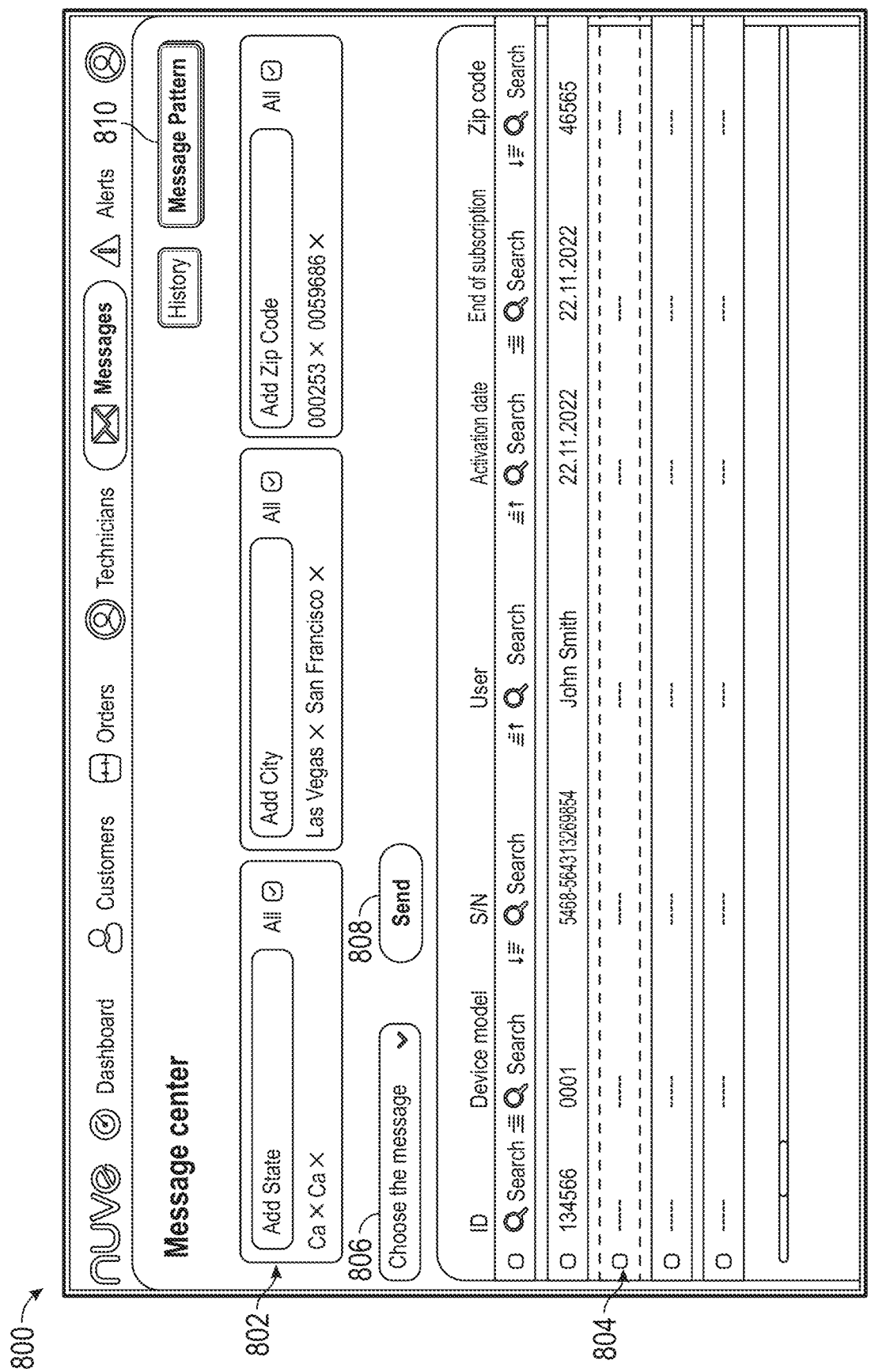

FIG. 8A illustrates an example GUI for a message center 800. The message center 800 can include a device filter 802 that allows a contractor to filter and/or search the thermostats by geographical location. The message center 800 can include a selection table 804 that allows a contractor to select the specific control unit to send a message to. The message center 800 can include a message selection 806 that allows a contractor to select a previously configured message to be sent to the selected control unit. The message center 800 can include a send message option 808. The send message option 808 can cause the selected message from the message selection 806 to be sent to each selected control unit from the selection table 804. The selected message may be set to the customer management system 150 and the control unit 104, as is described in processes (4) and (5) of FIG. 3. The message center 800 may include a message pattern option 810 that navigates a user to a message pattern GUI, such as the message pattern GUI 850 described in FIG. 8B below.

Figure 8B:

FIG. 8B illustrates an example message pattern GUI 850. The GUI 850 can include a message content editor 852. The message content editor 852 can allow a contractor to generate a title and text for a message. The message content editor 852 can allow a message to be saved. The saved message may be placed in the message selection 806 of FIG. 8A. The GUI 850 can include a message history 854. The message history may include information regarding previously sent messages and associated information, such as the ID of the sender, the date the message was sent, the recipient(s) of the message, the title of the message, and the text of the message, to name a few. The message history 854 can be exported to the contractor computing device 110, for example as CSV files.

The contractor dashboard 700, GUI 750, message center 800 and/or message content editor 852 may include elements customized to an associated contractor and/or user. The customized elements can include, for example, names and/or logos associated with a contractor, names and/or logos associated with a user, and/or a customized color scheme, to name a few. The customized elements may be configured by the contractor and/or user. For example, a contractor and/or user may be prompted to configure the customized elements when the contractor and/or user first accesses the customer management system 150.

Example Processes

Process for Installation Verification

Figure 9:
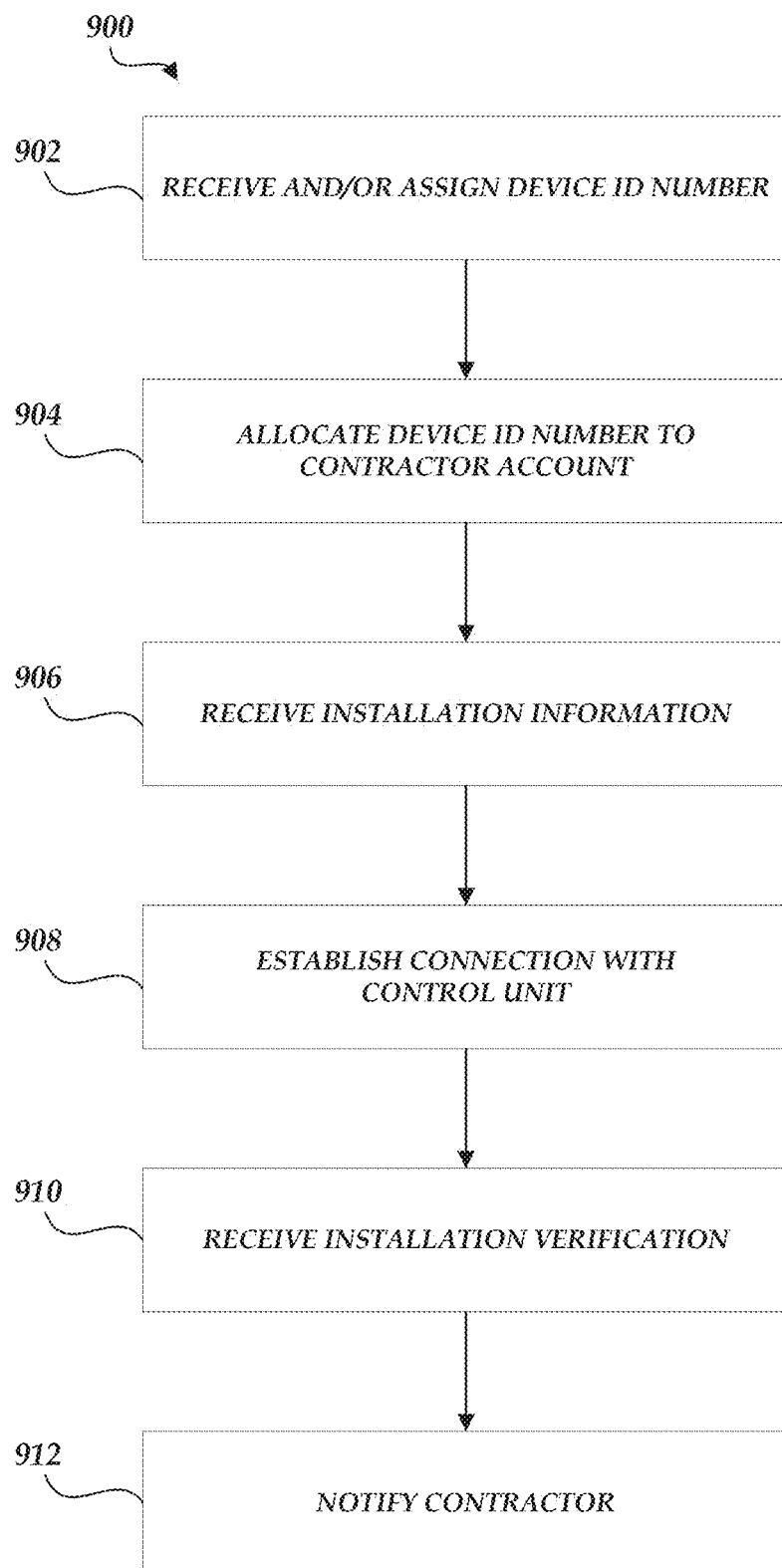
FIG. 9 illustrates a flow diagram of a routine 900 for providing an installed device verification.

FIG. 9 illustrates a flow diagram of a routine 900 for providing an installed device verification. The steps of routine 900 are being described as generally being performed by a customer management system 150. The functions described in association with FIG. 9 can be performed in a different sequence, can be added, merged, or left out altogether (e.g., not all described acts or events are necessary for the practice of the algorithms). Moreover, in certain embodiments, functions, acts or events can be performed concurrently.

At block 902, the customer management system 150 receives and/or assigns devices, such as the control unit 104, unique identification numbers. For example, the customer management system 150 can receive and assign the serial numbers generated and labelled during production to each of the control units 104. The unique identification numbers can be tracked by the customer management system 150 and stored in a database of identification numbers in the datastore 132.

At block 904, the customer management system 150 allocates the unique identification numbers to contractor accounts. For example, the customer management system 150 can allocate each of the unique identification numbers assigned to a batch of control units that a contractor purchases to an account associated with the contractor. The customer management system 150 can store the allocation in datastore 132. The customer management system 150 can make the allocation accessible through an API to allow contractors to access and designate information associated with unique identification numbers allocated each contractor.

At block 906, the customer management system 150 receives installation information from a contractor computing device 110 of a list of unique identification numbers of control units to be installed with HVAC for customers. For example, customer management system 150 receive the verification from an API on the customer management system 150 verifying a list of unique identification numbers of control units to be installed. The list of unique identification numbers can include information such as an address the control unit is to be installed and other billing information. The customer management system 150 can store the list of unique identification numbers in the datastore 132 along with the information associated with the unique identification numbers.

At block 908, the customer management system 150 can establish a connection with a control unit 104. For example, the customer management system 150 can establish a connection with a newly installed control unit 104. A newly installed control unit 104 may prompt a technician to establish a network connection. Once a network connection is established, the control unit 104 may automatically connect with the customer management system 150 and exchange information with the customer management system 150. For example, the control unit 104 can provide its associated identification number and the customer management system 150 can use the identification number of the control unit 104 to authenticate the HVAC control unit on the customer management system 150.

At block 910, the customer management system 150 can receive an installation verification from the technician computing device 120. For example, the technician computing device 120 can send details of the installation the customer management system 150, such as details of the HVAC system 102 the control unit 104 is installed in, information regarding the owner/end-user of the control unit 104, a job number associated with the installation, and the like. The customer management system 150 may also receive other information associated with the newly installed control unit, such as the location of the installation and/or the location of the technician computing device 120, which can be based on GPS, and other billing information. The customer management system 150 can use the GPS location to identify an address of the building unit, and/or verify that an address provided by the contractor matches the control unit location. For example, the customer management system 150 can compare the identification number and the address of the installation with the stored data provided by the contractor. If the identification number and the address of the installation does not match the stored list, the customer management system 150 can flag the identification number. The customer management system 150 may associate an identification of the contractor and/or technician associated with the installation of the control unit 104 within a contractor account.

At block 912, the customer management system 150 can provide an alert or other notification indicating the flagged unique identification number has been installed in an HVAC system. For example, the customer management system 150 can notify the contractor, through a contractor computing device 110, that the flagged unique identification number has been installed and provide the address associated with the installation. The customer management system 150 may receive a resolution for the alert. For example, the contractor may determine that the information in the stored list of unique identification numbers is incorrect and send the customer management system 150 a corrected the list of unique identification numbers so that the address of the installed control unit matches the stored address associated with the unique identification number of the installed control unit.

Process for Generating Missing Device Notification

Figure 10:
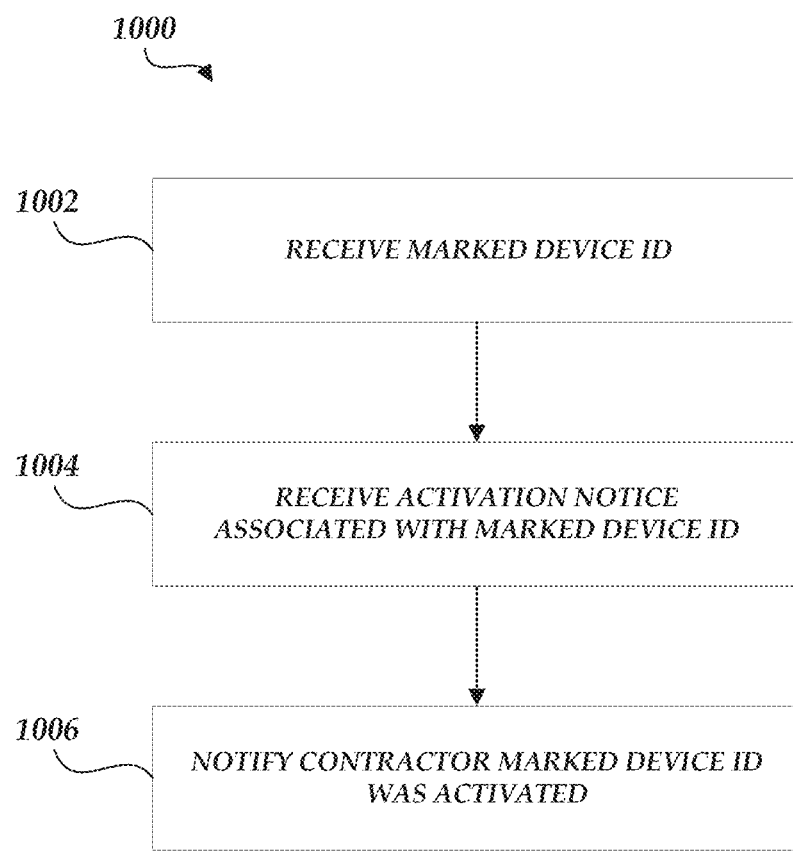
FIG. 10 illustrates a flow diagram of a routine 1000 for providing a marked device notification.

FIG. 10 illustrates a flow diagram of a routine 1000 for providing a marked device notification. The steps of routine 1000 are being described as generally being performed by customer management system 150. The functions described in association with FIG. 10 can be performed in a different sequence, can be added, merged, or left out altogether (e.g., not all described acts or events are necessary for the practice of the algorithms). Moreover, in certain embodiments, functions, acts or events can be performed concurrently.

At block 1002, the customer management system 150 can receive notice of a missing or otherwise marked device, such as a control unit 104. A control unit 104 may be marked because the control unit 104 was stollen or missing, previously replaced by warranty, previously installed in a different HVAC system 102, and/or the control unit 104 does not match any record in the customer management system 150. For example, customer management system 150 can receive from an API on the customer management system 150 the unique identification number of a marked control unit 104. In some instances, the customer management system 150 may be notified of a marked control unit 104 before indication is received that the marked control unit was installed in an HVAC system, such as in block 910 of FIG. 9. In other instances, the customer management system 150 may be notified of a marked control unit 104 after providing an indication that the marked control unit 104 was installed in an HVAC system, such as in response to block 912 of FIG. 9. The customer management system 150 can store the unique identification number of the marked control unit 104 on the datastore 132.

At block 1004, the customer management system 150 can receive a notification that the marked control unit 104 has been activated. For example, the customer management system 150 can receive the unique identification number when the marked control unit 104 accesses the control unit API on the customer management system 150. In another example, the customer management system 150 can receive the identification number from a technician computing device 120 as described in block 910 of FIG. 9. The customer management system 150 can compare the unique identification number of the activated control unit 104 to the unique identification number of the marked control unit 104 stored on the datastore 132. If the unique identification number of the activated control unit matches the unique identification number stored on the datastore 132, the customer management system 150 can flag the unique identification number of the activated control unit 104 and/or disable the activate control unit 104.

At block 1006, the customer management system 150 can provide an alert or other notification indicating the flagged unique identification number has been installed in an HVAC system. For example, the customer management system 150 can notify the contractor, through a contractor computing device 110, that the flagged unique identification number has been installed and provide the address associated with the installation. In some embodiments, the customer management system 150 can receive instructions from the contractor computing device 110 to disable the control unit 104 associated with the flagged unique identification number.

Process for Maintenance Request

Figure 11:
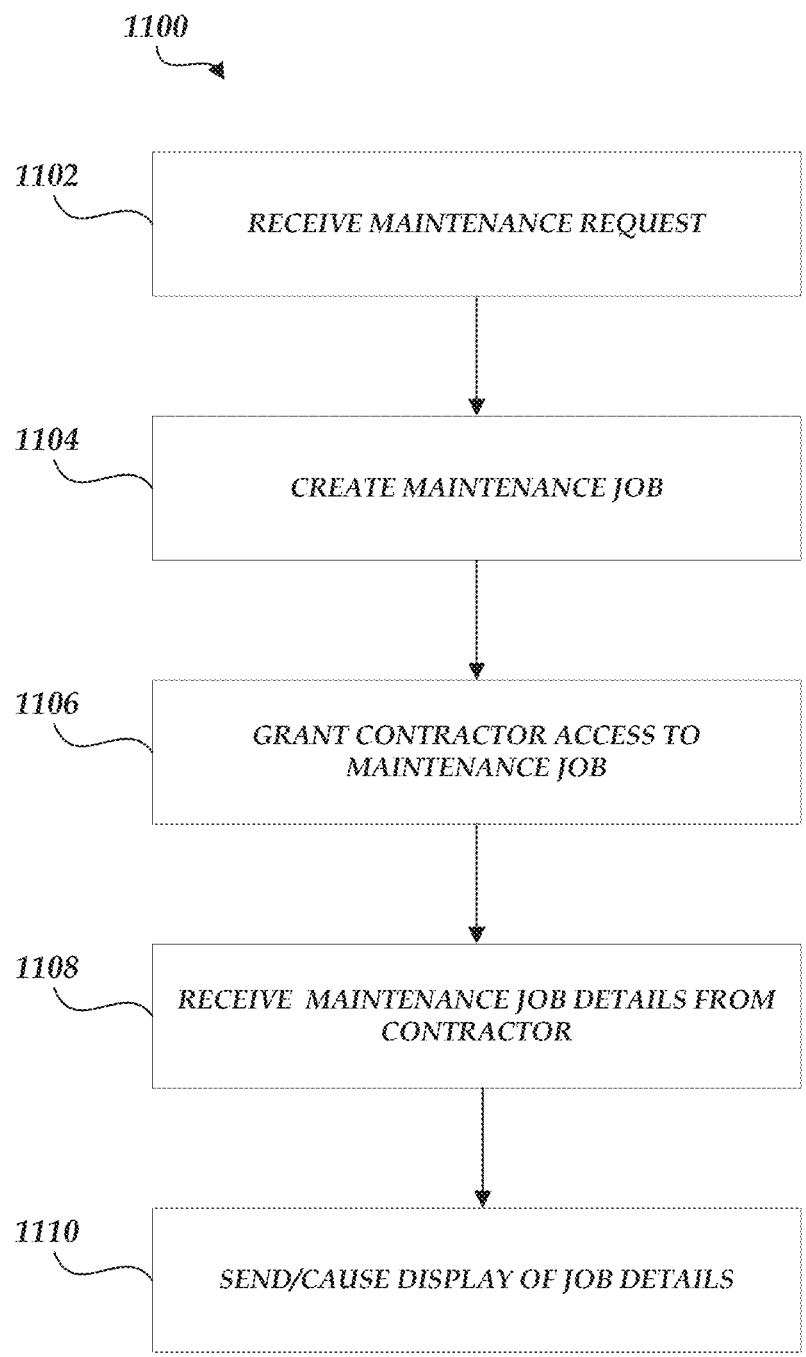
FIG. 11 illustrates a flow diagram of a routine 1100 for providing a direct maintenance request.

FIG. 11 illustrates a flow diagram of a routine 1100 for providing a direct maintenance request. The steps of routine 1100 are being described as generally being performed by a customer management system 150. The functions described in association with FIG. 11 can be performed in a different sequence, can be added, merged, or left out altogether (e.g., not all described acts or events are necessary for the practice of the algorithms). Moreover, in certain embodiments, functions, acts or events can be performed concurrently.

At block 1102, the customer management system 150 can receive a maintenance request from a control unit 104. For example, the customer management system 150 can receive a maintenance request generated by user interface of a control unit 104, such as GUI 680 of FIG. 6D. In some embodiments, the customer management system 150 can receive the maintenance request from another source, such as a contractor computing device 110 or another computing device.

At block 1104, the customer management system 150 creates a maintenance job. For example, the customer management system 150 can generate a maintenance job and store the maintenance job in the datastore 132. The maintenance job can include maintenance job source information, such as a unique identification number of a control unit 104 associated with the maintenance job, the address of the location associated with the maintenance job, the customer name associated with the maintenance job, and/or the service requested for the maintenance job. The maintenance job can also include maintenance job designation information, such as a contractor associated with the maintenance job. The contractor associated with the maintenance job can be determined by the contractor the unique identification number the control unit 104 has been allocated to.

At block 1106, the customer management system 150 grants a contractor computing device 110 access to the maintenance job. For example, the customer management system 150 can allow the contractor computing device 110 of a contractor associated with the maintenance job to access an API allowing the contractor computing device 110 to receive and designate information associated with the maintenance job. A contractor computing device 110 with access to the maintenance job can access and/or update the maintenance job source information and the maintenance job designation information.

At block 1108, the customer management system 150 receives service details from the contractor computing device 110. For example, the customer management system 150 can receive service details for the maintenance job an API on the customer management system 150. The service details can include an identification of the technician(s) to perform the maintenance job, cost estimates for the maintenance job, and/or provide the date and time for the maintenance job. The customer management system 150 can store the service details in the datastore 132.

At block 1110, the customer management system 150 sends the service details to the control units 104 and/or causes the control unit 104 to display the service details. For example, the customer management system 150 can cause all, or a portion of, the service details to display on a UI of the control unit 104 such as the identification of the technician(s) to perform the maintenance job, cost estimates for the maintenance job, and/or the date and time for the maintenance job. In some embodiments, the customer management system 150 sends the service information directly to the customer. For example, the customer management system 150 can send all, or a portion of, the service details directly to the customer using SMS messaging, email, and/or the like. In another example, the customer management system 150 can provide the customer access to a customer specific API on the customer management system 150 for accessing the service details.

The customer management system 150 may send at least a portion of the service details to the technician computing devices 120 associated with the technician(s) assigned to perform the maintenance job. For example, the customer management system 150 may send the technician computing devices 120 the location of the job, the scheduled date and time for the maintenance job, the service requested for the maintenance job, cost estimates for the maintenance job. In some embodiments, the service information is sent directly to the technician and/or the technician computing devices 120. For example, all, or a portion of, the service details can be sent directly to the technician computing devices 120 through SMS messaging, email, and/or the like. In another example, the technician may access a technician specific interface on the customer management system 150 and access at least a portion of the service details, such as on a web browser of a technician computing device 120.

Process of Displaying Alerts

Figure 12A:
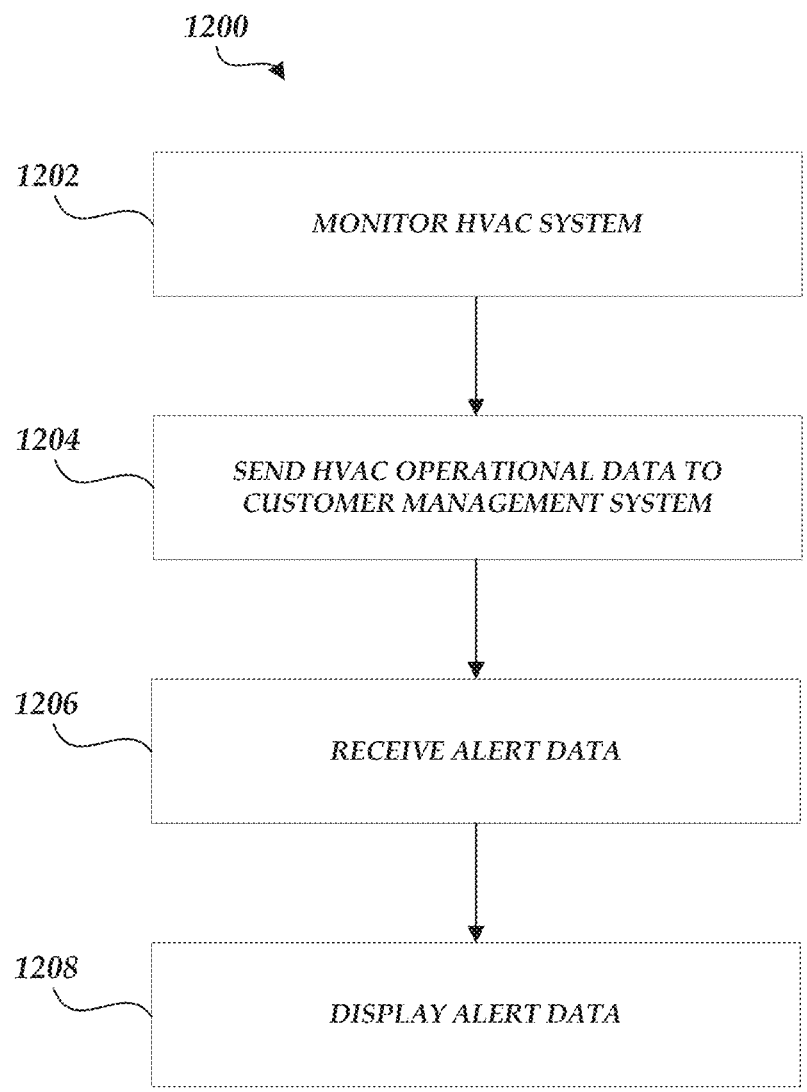
FIG. 12A illustrates a flow diagram of a routine 1200 for displaying alerts.

FIG. 12A illustrates a flow diagram of a process 1200 for displaying alerts. The steps of routine 1200 are being described as generally being performed by a control unit 104. The functions described in association with FIG. 12A can be performed in a different sequence, can be added, merged, or left out altogether (e.g., not all described acts or events are necessary for the practice of the algorithms). Moreover, in certain embodiments, functions, acts or events can be performed concurrently.

At block 1202, the control unit 104 monitors the HVAC system. For example, the HVAC system can include various sensors to collect control unit and HVAC data. The control unit and HVAC data can include information regarding the operation of the HVAC system, such as temperature readings, humidity readings, air pressure readings, ambient light readings, motion detection readings, rates of temperature change, operation time, power draw, temperature change while HVAC system is dormant, air quality readings (e.g., CO2e readings), and/or any information useful in determining the operating status and/or efficiency of an HVAC system. The control unit and HVAC data may also include information about the settings of the control unit 104, such as information regarding operation setting changes of the control unit 104.

At block 1204, the control unit 104 sends the control unit and HVAC data to the customer management system 150 so that the customer management system 150 can store and process the control unit and HVAC data. The processing of the control unit and HVAC data can include a determination of the status of the control unit 104, such as that the control unit 104 has malfunctioned, the HVAC system associated with the control unit 104 is performing below an efficiency threshold, a filter change or other periodic maintenance is needed, the air quality has fallen below a threshold level of safety, and/or other status indications for control unit 104. The processed control unit and HVAC data may be compiled into alert data. The alert data can include information associated with the status of the control unit 104. For example, if the processed control unit and HVAC data contains an indication that control unit 104 has malfunctioned, the alert data may include information regarding the malfunction. Other examples of the alert data include information regarding a determined efficiency of the HVAC system associated with control unit 104, an indication that a filter has expired, a date that a filter is predicted to expire or of another periodic maintenance, an indication that ventilation should be used or installed, and/or information regarding other status indications for control unit 104.

At block 1206, the control unit 104 receives the alert data from the customer management system 150.

At block 1208, the control unit 104 displays the alert data. For example, the control unit can display all, or a portion of, the alert data on a GUI of the control unit 104, such as in an alert notification. An alert notification can include a title of the alert notification and/or a description of the alert notification, such as descriptions of needed maintenance, dates a filter is predicted to expire or of another periodic maintenance, an indication that ventilation should be used or installed, and/or descriptions regarding other status indications for control unit 104.

Figure 12B:
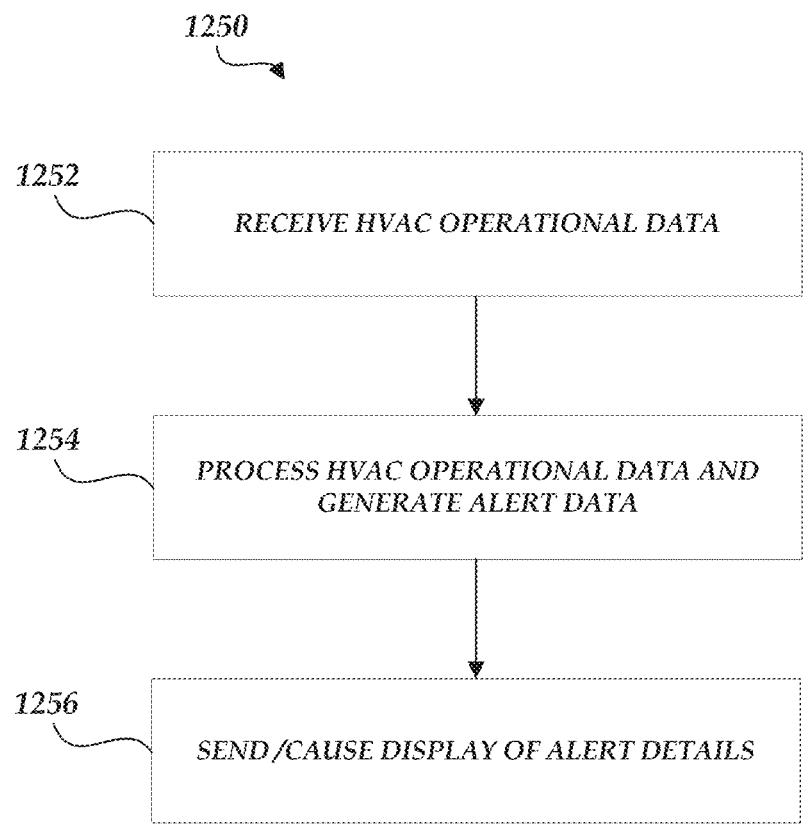
FIG. 12B illustrates a flow diagram of a routine 1250 for generating alerts.

FIG. 12B illustrates a flow diagram of a routine 1250 for generating alerts. The steps of routine 1250 are being described as generally being performed by a customer management system 150. The functions described in association with FIG. 12B can be performed in a different sequence, can be added, merged, or left out altogether (e.g., not all described acts or events are necessary for the practice of the algorithms). Moreover, in certain embodiments, functions, acts or events can be performed concurrently.

At block 1252, the customer management system 150 receives control unit and HVAC data from a control unit 104. The control unit and HVAC data can include information regarding the operation of an HVAC system the control unit 104 is installed in, such as temperature readings, humidity readings, air pressure readings, ambient light readings, motion detection readings, rates of temperature change, operation time, power draw, temperature change while HVAC system is dormant, air quality readings (e.g., CO2e readings), and/or any information useful in determining the operating status and/or efficiency of an HVAC system. The control unit and HVAC data may also include information about the settings of the control unit 104, such as information regarding operation setting changes of the control unit 104.

At block 1254, the customer management system 150 processes control unit and HVAC data and generates alert data. For example, the customer management system 150 may process the control unit and HVAC data and determine a status of the control unit 104, such as that control unit 104 has malfunctioned, the HVAC system associated with the control unit 104 is performing below an efficiency threshold, a filter change or other periodic maintenance is needed, air quality is below a threshold value, and/or other status indications for control unit 104. The alert data can include information associated with the status of the control unit 104. For example, if the customer management system 150 determines that control unit 104 has malfunctioned, the alert data may include information regarding the malfunction. Other examples of the alert data include information regarding a determined efficiency of the HVAC system associated with control unit 104, an indication that a filter has expired, a date that a filter is predicted to expire or of another periodic maintenance, an indication that ventilation should be used or installed, and/or information regarding other status indications for control unit 104.

At block 1256, the customer management system 150 sends the alert data to the control unit 104 and/or causes the control unit 104 to display the alert data. For example, the customer management system 150 can cause all, or a portion of, the alert data to display on a UI of the control unit 104 through an alert notification. An alert notification can include a title of the alert notification and/or a description of the alert notification, such as descriptions of needed maintenance, dates a filter is predicted to expire or of another periodic maintenance, an indication that ventilation should be used or installed, and/or descriptions regarding other status indications for control unit 104. In some embodiments, the alert data is sent directly to the customer. For example, all, or a portion of, the service details can be sent directly to the customer through SMS messaging, email, and/or the like. In another example, the customer management system 150 may make the alert data available on a customer specific API, accessible by a computing device.

Figure 13:
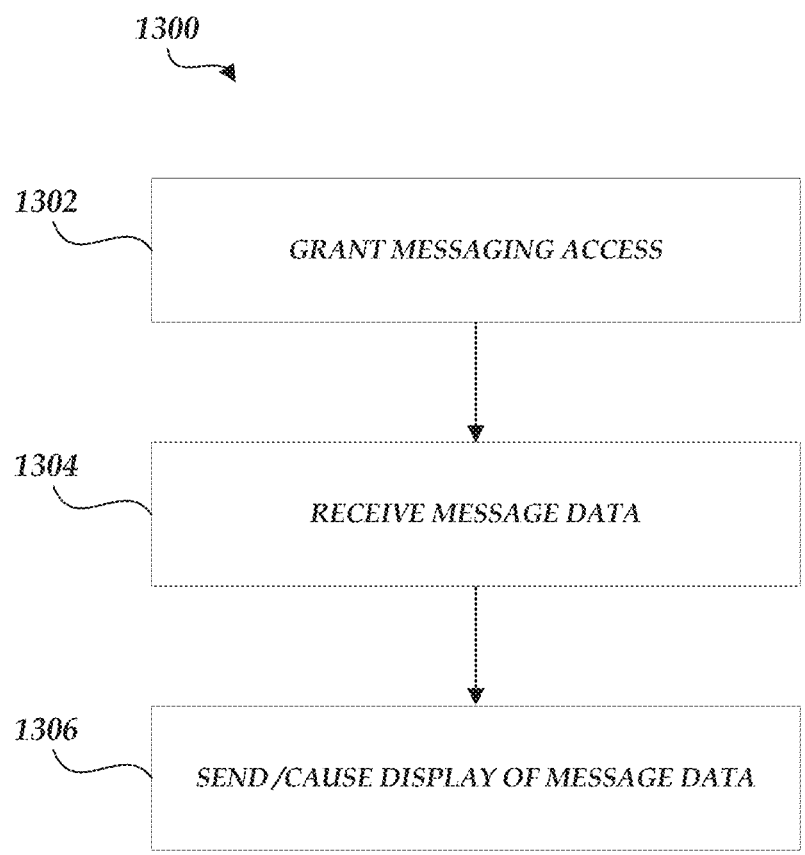
FIG. 13 illustrates a flow diagram of a routine 1300 for providing a messaging service.

FIG. 13 illustrates a flow diagram of a routine 1300 for providing a messaging service. The steps of routine 1300 are being described as generally being performed by customer management system 150. The functions described in association with FIG. 13 can be performed in a different sequence, can be added, merged, or left out altogether (e.g., not all described acts or events are necessary for the practice of the algorithms). Moreover, in certain embodiments, functions, acts or events can be performed concurrently.

At block 1302, the customer management system 150 grants a contractor computing device 110 messaging access to a control unit 104. Granting the messaging access to the control unit 104 may occur when the unique identification number of the control unit 104 is allocated to a contractor account associated with the contractor computing device 110. In some embodiments, granting the contractor computing device 110 messaging access to the control unit 104 may occur in response to another event, such as the contractor associated with the contractor computing device 110 subscribing to a service, a user of the control unit 104 opting into a messaging subscription, a request by the contractor to receive messaging access to the control unit 104 and the like.

At block 1304, the customer management system 150 receives message data from the contractor computing device 110. For example, the customer management system 150 can receive message data via an API on the customer management system 150 to be sent to the control unit 104. The message data can include message information, such as text and image information to be displayed on the control unit 104, and message timing information, such as a date and time for the message to begin display and a length of time the message information is to be displayed on the control unit 104.

At block 1306, the customer management system 150 sends the message data to the control unit 104 and/or causes the control unit 104 to display the message data. For example, the customer management system 150 can cause all, or a portion of, the message data to display on a UI of the control unit 104. When the message data contains message timing information, the customer management system 150 can wait for a designated date and time prior to sending the message data to the control unit 104 and/or causing the control unit 104 to display the message data. The customer management system 150 and can cause the message data to stop displaying on the UI of the control unit 104 when the designated length of time the message information is to be displayed expires.

Figure 14:
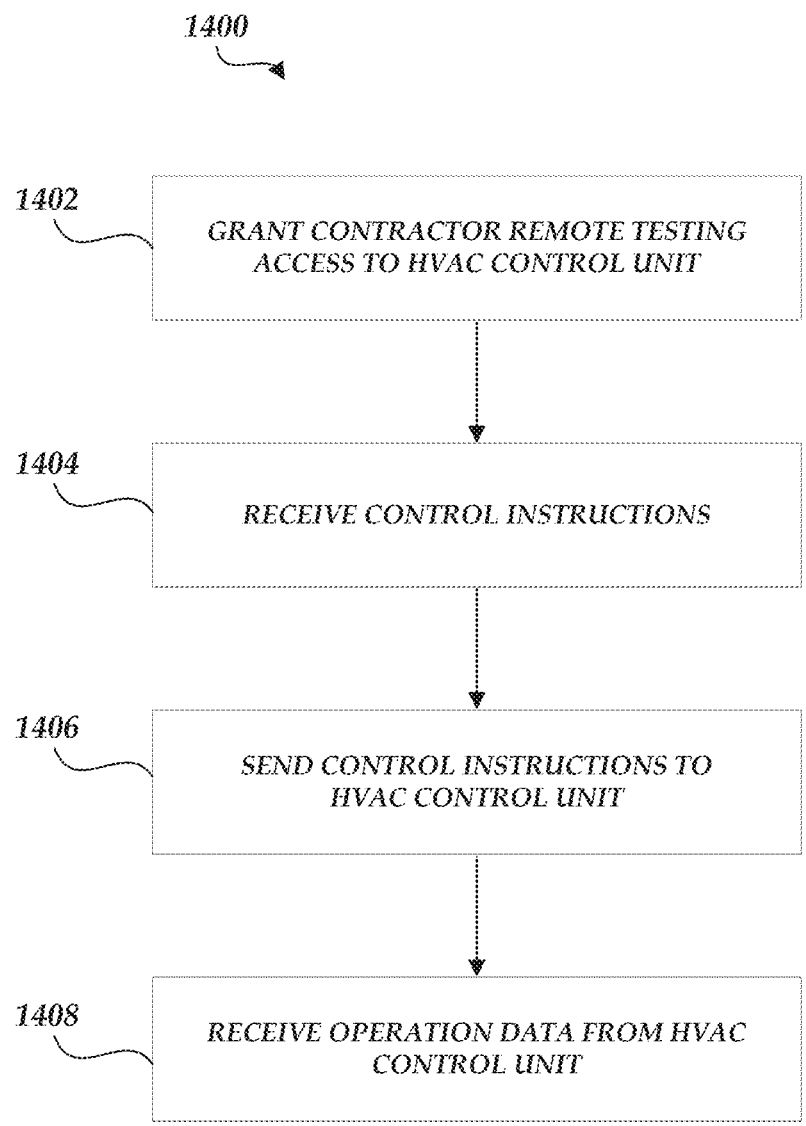
FIG. 14 illustrates a flow diagram of a routine 1400 for providing a remote testing service.

FIG. 14 illustrates a flow diagram of a routine 1400 for providing a remote testing service. The steps of routine 1400 are being described as generally being performed by customer management system 150. The functions described in association with FIG. 14 can be performed in a different sequence, can be added, merged, or left out altogether (e.g., not all described acts or events are necessary for the practice of the algorithms). Moreover, in certain embodiments, functions, acts or events can be performed concurrently.

At block 1402, the customer management system 150 grants a contractor computing device 110 remote testing access to a control unit 104. As a security check, the customer management system 150 may ensure that the contractor associated with the contractor computing device 110 has been allocated the unique identification number of the control unit 104, as is described in FIG. 9, prior to granting the contractor computing device 110 remote testing access. In some embodiments, granting the contractor computing device 110 remote testing access to the control unit 104 may occur in response to another event, such as the contractor associated with the contractor computing device 110 subscribing to a service, a user of the control unit 104 opting into remote testing, a request by the contractor to receive remote testing access to the control unit 104 and the like.

At block 1404, the customer management system 150 receives control instructions from the contractor computing device 110. For example, the customer management system 150 can receive control instructions via an API on the customer management system 150 to be sent to the control unit 104. The control instructions can include a set of operations for the control unit 104 and/or the HVAC system associated with the control unit 104 to perform. For example, the HVAC system associated with the control unit 104 may have been dormant for a period of time (e.g., for a period of months during the spring season) and the set of operations may include an instruction to run the HVAC for a continuous period of time.

At block 1406, the customer management system 150 sends the control instructions to the control unit 104. The customer management system 150 can convert the control instructions into executable instructions for the control unit 104. The customer management system 150 can generate computer-executable code from the control instructions and send the computer-executable code to the control unit. For example, an instruction to run the HVAC for a continuous period of time may be converted into computer-executable code configured to cause one or more hardware processors of the control unit 104 to control an HVAC to run for the continuous period of time.

The control instructions can cause the control unit 104 to control the HVAC system associated with the control unit 104. The control instructions can cause the control unit 104 to collect operation data during the execution of the control instructions. For example, the control instructions can cause the control unit to collection operation data while running the HVAC system. The operation data can include information regarding the operation of the HVAC system, such as temperature readings, humidity readings, air pressure readings, ambient light readings, motion detection readings, rates of temperature change, operation time, power draw, temperature change while HVAC system is dormant, air quality readings (e.g., $CO_2e$ readings), and/or any information useful in determining the operating status and/or efficiency of an HVAC system.

At block 1408, the customer management system 150 receives the operation data from the control unit 104. The operation data can be stored in datastore 132. The customer management system 150 to determine a status of an HVAC system. For example, the customer management system 150 may utilize the operation data and determine that the HVAC system needs maintenance prior to operation during a peak season. Other examples of potential determined statuses of an HVAC system include the HVAC system is operating normally, the HVAC system needs a filter changed, the HVAC is running inefficiently, the HVAC system is inoperable, etc. In some embodiments, the customer management system 150 sends the status of the HVAC system is sent to a contractor and/or a user of the control unit 104. For example, the status may be indicated on an API on the customer management system 150, accessible by the contractor computing device 110 or the control unit 104.

Additional Considerations

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A heating, ventilation, and air conditioning ("HVAC") control unit for controlling an HVAC system, the HVAC control unit comprising:
    at least one processor;
    a user interface;
    at least one sensor; and
    non-transitory computer-readable instructions which, when executed by the at least one processor, cause the at least one processor to perform operations comprising:
        receiving weather information from a remote server computing system, the weather information being specific to a location of the HVAC system within a building unit;
        receiving, from the at least one sensor, HVAC data comprising:
            air quality data regarding air processed by the HVAC; and
            at least one setting of the HVAC;
        combining the weather information and the HVAC data, resulting in HVAC operational data;
        transmitting, from the HVAC control unit to a customer management system, the HVAC operational data, wherein the customer management system:
            generates a maintenance request based on the HVAC operational data, the maintenance request comprising:
                a unique identification number of the HVAC control unit;
                an address of the location of the HVAC control unit; and
                a service requested;
            transmits the maintenance request to a contractor, wherein the contractor verifies the HVAC control unit is not marked as stolen or missing;
            receives control instructions for the HVAC control unit from the contractor via an Application Programming Interface;
            transmits the control instructions to the HVAC control unit; and
            transmits an alert regarding the maintenance request to the HVAC control unit;
        receiving the control instructions from the customer management system;
        receiving the alert from the customer management system; and
        displaying the alert via the user interface.

2. The HVAC control unit of claim 1, wherein the alert includes timing information, wherein the timing information identifies (1) a date and time when the alert should be displayed on the user interface, and (2) a duration of time for which the alert will be displayed.

3. The HVAC control unit of claim 1, wherein the customer management system is configured to have remote testing access to the HVAC control unit, wherein the non-transitory computer-readable instructions further cause the at least one processor to perform operations comprising:
    receiving, from the customer management system, control instructions, wherein the control instructions are configured to cause the HVAC control unit to operate the HVAC system; and
    sending, to the customer management system, control instruction-based operational data associated with operation of the HVAC system under the control instructions.

4. The HVAC control unit of claim 3, wherein the non-transitory computer-readable instructions further cause the at least one processor to perform operations comprising:
    receiving, from the contractor via the customer management system, maintenance information associated with the maintenance request; and
    displaying, via the user interface, the maintenance information.

5. The HVAC control unit of claim 1, wherein the maintenance request is automatically generated by the customer management system in response to the HVAC operational data.

6. The HVAC control unit of claim 1, wherein the address of the location of the HVAC control unit is verified via a Global Positioning System (GPS); and
  wherein the contractor verifies the HVAC control unit is enrolled in a membership sold by the contractor for restocking of the HVAC system.

7. A computer-implemented method comprising:
  receiving weather information from a remote server computing system, the weather information being specific to a location of a building unit having a heating, ventilation, and air conditioning ("HVAC") control unit for a HVAC system, the HVAC system being within the building unit;
  receiving, from at least one sensor, HVAC data comprising:
    air quality data regarding air processed by the HVAC system; and
    at least one setting of the HVAC system;
  combining, via at least one processor, the weather information and the HVAC data, resulting in HVAC operational data;
  transmitting, from the HVAC control unit to a customer management system, the HVAC operational data, wherein the customer management system:
    generates a maintenance request based on the HVAC operational data, the maintenance request comprising:
      a unique identification number of the HVAC control unit;
      an address of the location of the HVAC control unit; and
      a service requested;
    transmits the maintenance request to a contractor, wherein the contractor verifies the HVAC control unit is not marked as stolen or missing;
    receives control instructions for the HVAC control unit from the contractor via an Application Programming Interface;
    transmits the control instructions to the HVAC control unit; and
    transmits an alert regarding the maintenance request to the HVAC control unit;
  receiving the control instructions from the customer management system;
  receiving the alert from the customer management system; and
  displaying the alert via a user interface.

8. The computer-implemented method of claim 7, wherein the alert comprises timing information, wherein the timing information identifies (1) a date and time when the alert should be displayed on the user interface, and (2) a duration of time for which the alert will be displayed.

9. The computer-implemented method of claim 8, wherein the customer management system is configured to have remote testing access to the HVAC control unit, and wherein the computer-implemented method further comprises:
  receiving, at the HVAC control unit from the customer management system, control instructions, wherein the control instructions are configured to cause the HVAC control unit to operate the HVAC system; and
  transmitting, from the HVAC control unit to the customer management system, control instruction-based operational data associated with operation of the HVAC system under the control instructions.

10. The computer-implemented method of claim 9, further comprising:
  receiving, from the contractor via the customer management system, maintenance information associated with the maintenance request; and
  displaying, via the user interface, the maintenance information.

11. The computer-implemented method of claim 7, wherein the customer management system determines a status of the HVAC system based on the HVAC operational data using one or more machine learning models.

12. Non-transitory computer storage media storing instructions that when executed by a system of at least one processor, cause the at least one processor to perform operations comprising:
  receiving weather information from a remote server computing system, the weather information being specific to a location of a building unit having a heating, ventilation, and air conditioning ("HVAC") control unit for a HVAC system, the HVAC system being within the building unit;
  receiving, from at least one sensor, HVAC data comprising:
    air quality data regarding air processed by the HVAC system; and
    at least one setting of the HVAC system;
  combining the weather information and the HVAC data, resulting in HVAC operational data;
  transmitting, from the HVAC control unit to a customer management system, the HVAC operational data, wherein the customer management system:
    generates a maintenance request based on the HVAC operational data, the maintenance request comprising:
      a unique identification number of the HVAC control unit;
      an address of the location of the HVAC control unit; and
      a service requested;
    transmits the maintenance request to a contractor, wherein the contractor verifies the HVAC control unit is not marked as stolen or missing;
    receives control instructions for the HVAC control unit from the contractor via an Application Programming Interface;
    transmits the control instructions to the HVAC control unit; and
    transmits an alert regarding the maintenance request to the HVAC control unit;
  receiving the control instructions from the customer management system;
  receiving the alert from the customer management system; and
  displaying the alert via a user interface.

13. The non-transitory computer storage media of claim 12, wherein the alert comprises timing information, wherein the timing information identifies (1) a date and time when the alert should be displayed on the user interface, and (2) a duration of time for which the alert will be displayed.

14. The non-transitory computer storage media of claim 12, wherein the customer management system is configured to have remote testing access to the HVAC control unit, and wherein the instructions are further configured to cause the at least one processor to perform additional operations comprising:
  receiving, from the customer management system, control instructions, wherein the control instructions are configured to cause the HVAC control unit to operate the HVAC system; and sending, to the customer management system from the HVAC control unit, control instructions-based operational data associated with operation of the HVAC system under the control instructions.

\* \* \* \* \*